United States Patent
Yamamoto et al.

(10) Patent No.: US 7,459,194 B2
(45) Date of Patent: Dec. 2, 2008

(54) OPTICAL INFORMATION RECORDING MEDIUM, MANUFACTURING METHOD OF THE SAME AND OPTICAL INFORMATION RECORDING AND REPRODUCING APPARATUS

(75) Inventors: Hiroki Yamamoto, Hitachi (JP); Hideto Momose, Hitachiota (JP); Yuuichi Sawai, Hitachi (JP); Takashi Naito, Mito (JP)

(73) Assignee: Hitachi, Ltd., Tokyo (JP)

( * ) Notice: Subject to any disclaimer, the term of this patent is extended or adjusted under 35 U.S.C. 154(b) by 679 days.

(21) Appl. No.: 11/029,452

(22) Filed: Jan. 6, 2005

(65) Prior Publication Data

US 2005/0213487 A1      Sep. 29, 2005

(30) Foreign Application Priority Data

Jan. 8, 2004 (JP) .............................. 2004-003102
Sep. 9, 2004 (JP) .............................. 2004-261979

(51) Int. Cl.
*B32B 3/02* (2006.01)
(52) U.S. Cl. .................. 428/64.1; 428/64.4; 430/270.12
(58) Field of Classification Search ................. 428/64.5; 430/270.13
See application file for complete search history.

(56) References Cited

U.S. PATENT DOCUMENTS

| | | | | |
|---|---|---|---|---|
| 5,985,401 A * | 11/1999 | Yamamoto et al. | ......... | 428/64.1 |
| 6,115,335 A * | 9/2000 | Takai | ...................... | 369/44.32 |
| 6,385,162 B1 * | 5/2002 | Nagase et al. | ............... | 369/288 |
| 6,667,946 B1 * | 12/2003 | Yamamoto et al. | ....... | 369/275.1 |
| 6,700,852 B1 * | 3/2004 | Yamamoto et al. | .......... | 369/100 |
| 6,730,384 B2 * | 5/2004 | Yamamoto et al. | ......... | 428/64.1 |
| 6,790,502 B1 * | 9/2004 | Yamamoto et al. | ......... | 428/64.1 |
| 6,896,946 B2 * | 5/2005 | Chen | ......................... | 428/64.1 |
| 6,961,300 B2 * | 11/2005 | Cheong et al. | ............ | 369/275.1 |
| 6,987,721 B2 * | 1/2006 | Yamamoto et al. | ............ | 369/94 |
| 7,042,830 B2 * | 5/2006 | Shinotsuka et al. | ....... | 369/275.1 |
| 7,245,577 B2 * | 7/2007 | Yamamoto et al. | ....... | 369/275.2 |

FOREIGN PATENT DOCUMENTS

| | | |
|---|---|---|
| JP | 10-340482 | 12/1998 |
| JP | 2003-162843 | 6/2003 |
| JP | 2003-195374 | 7/2003 |
| JP | 2003-228088 | 8/2003 |
| JP | 2003-295237 | 10/2003 |
| JP | 2004-133329 | 4/2004 |
| JP | 2004-152392 | 5/2004 |
| JP | 2004-177899 | 6/2004 |

* cited by examiner

*Primary Examiner*—Elizabeth Mulvaney
(74) *Attorney, Agent, or Firm*—Antonelli, Terry, Stout & Kraus, LLP.

(57) ABSTRACT

An optical information recording medium includes at least a reflecting layer, an optical information recording layer, a super-resolution layer and a protective layer. The super-resolution layer is a thin layer whose an optical constant changes nonlinearly due to a red shift of its band gap, and made of solid solution, compound or mixture of metal oxides containing two or more types of metal ions of the same valence. Ion radius unconformity $\Delta R=|(RM_i-RM_j)/RM_j|$ between ion radii $RM_i$ and $RM_j$ of two types of metal ions $M_i$ and $M_j$ arbitrarily selected from the two or more types of metal ions is 8% or less. The difference $\Delta E=Eg-E$ between band gap energy Eg of the mixture of the metal oxides and energy E corresponding to a wavelength of the laser beam is a more 0.4 or less 1.4 eV.

21 Claims, 24 Drawing Sheets

OPTICAL INFORMATION RECORDING MEDIUM, MANUFACTURING METHOD OF THE SAME AND OPTICAL INFORMATION RECORDING AND REPRODUCING APPARATUS

BACKGROUND OF THE INVENTION

The present invention relates to a high-capacity optical information recording medium, a manufacturing method thereof, and an optical information recording and reproducing apparatus.

The progress of information-oriented society in recent years using optical communications has been requiring the construction of a communication system capable of communicating a large amount information at high speed. Optical devices essential for deploying such high-capacity high-speed optical communication include optical information recording media for storing high-volume optical information. Further, with the improvement of quality of video images (e.g. television pictures) by digitization, high definition technology, etc., the development of high-capacity optical information recording media, capable of maintaining the video images in high quality states and allowing long-duration recording, is an urgent necessity.

As the optical information recording media, DVDs having a high storage capacity of 4.7 GB per side are in practical use and widely available today not only for computers but also as media for handling high-capacity video. The DVDs are widely used not only as read-only DVD-ROMs (in which information has been directly written on a substrate) but also as rewritable recording/reproducing media. As above, development for achieving higher record density of optical information recording media is in progress, in which a laser beam of a wavelength 650 nm still shorter than 780 nm for CDs, etc. is used as a means for achieving high-density information recording. However, in order to handle high-volume information for computer graphics, digital HDTV (High-Definition TV), etc. 4-5 times the present record density has to be attained. To achieve such high record density, optical discs employing a blue laser diode (wavelength: 405 nm) are being developed and an optical disc having a storage capacity of 23.3 GB/side has been brought into practical use.

The 23.3 GB/side optical disc is capable of storing two hours of HDTV broadcasting of high definition; however, to record content exceeding two hours, recording image quality has to be reduced. Therefore, in order to realize long-duration recording/reproducing without reducing the image quality, optical discs of still higher storage capacity have to be developed. However, it is thought to be difficult to further increase the storage capacity of the current 23.3 GB optical disc for the blue laser by use of conventional methods like shortening the wavelength, increasing NA (Numerical Aperture) of the lens, etc. Since the beam for the information read/write changes into an ultraviolet beam in the stream of reduction of wavelength, components (lens, resin, etc.) of optical discs and optical disc devices have to be designed to be transparent for ultraviolet light, requiring a considerable change in materials. Further, it becomes more difficult than ever to develop laser diodes or semiconductor lasers that are inexpensive and capable of emitting ultraviolet light stably.

In increasing NA of the lens, the distance between the lens and the disc decreases and dust on the disc easily scatters light, which requires the discs to be used in a dust-free environment, impairing exchangeability as an advantage of optical discs.

As above, a new method for increasing the storage capacity of optical information recording media is becoming indispensable. As techniques for further increasing the capacity of optical discs, multi-layer recording, multilevel recording, super-resolution recording, etc. are being developed. The super-resolution recording is one of the most powerful techniques in charge of the development of next-generation high-capacity optical information recording media.

The super-resolution recording is one of high-capacity recording techniques which is achieved by a reversible change in the optical constant (refractive index (n), extinction coefficient (k)) of a super-resolution layer which is formed in the multilayer structure (recording layer, protective layer, reflecting layer, etc.) of an optical disc. In the super-resolution recording technique, a laser beam is applied to the recording surface of an optical disc while reducing the laser beam diameter by use of a laser beam condensing function or masking function of the super-resolution layer. When irradiated with the laser beam for information read/write, the irradiated part of the super-resolution layer shifts into an excited state due to an increase in temperature or absorption of photons, changing its refractive index and extinction coefficient during the irradiation. Without the laser beam irradiation, the super-resolution layer returns to its original state. Reproduction of data stored in the optical disc is carried out by irradiating the disc with the laser beam, receiving reflected light from the disc with a pickup, and discriminating between recorded parts and unrecorded parts based on the light amount of the reflected light returning to the pickup. The area of the light returning to the pickup can be made smaller than that of the laser beam irradiating the disc by use of the reversible change in the optical constant of the super-resolution layer. In other words, the resolution can be increased by reducing the size of the area of data reading, with the optical mask effect of the super-resolution layer.

Incidentally, the extinction coefficient (k) is a quantity proportional to the light absorption coefficient of the material, increasing with the increase of the absorption coefficient. The two coefficients (refractive index (n), extinction coefficient (k)) are collectively called the optical constant.

The super-resolution layer has been implemented by thin layer materials mainly composed of cobalt oxide, etc. (see JP-A-10-340482). With the super-resolution effect in consequence of the remarkable change in the refractive index of the super-resolution layer, it becomes possible to obtain optical discs of higher storage capacity.

SUMMARY OF THE INVENTION

With the increase of the optical disc capacity, the wavelength of the laser beam irradiating optical discs shifts from the conventional wavelength 650 nm to a still shorter wavelength 405 nm, by which the change in the refractive index of the super-resolution layer becomes insufficient. It is therefore the primary object of the present invention to provide a high-capacity optical information recording medium equipped with a super-resolution layer capable of coping with such a change in the wavelength.

In accordance with an aspect of the present invention, there is provided an optical information recording medium comprising an optical information recording layer on which information is recorded by light energy, a reflecting layer reflecting light and a super-resolution layer reducing a diameter of a beam of light applied thereto which are formed on a substrate, in which the super-resolution layer has a wavelength $\lambda g$ corresponding to band gap energy Eg in a stationary state and a difference $\Delta\lambda=\lambda-\lambda g$ from a wavelength $\lambda$ of a laser beam to be irradiated on the optical information recording medium for information read/write is more than −100 nm to less than 60 nm. Moreover, a transmittance $T_0$ of the material in the stationary state at the wavelength λ changes to a transmittance T, so that an expression $\Delta T=|T-T_0|/T_0\times100$ may become over 10%. According to such condition, the optical information recording medium is formed of a metal oxide or semiconducting compound material.

In accordance with another aspect of the present invention, there is provided an optical information recording and reproducing apparatus comprising: an optical information recording medium including a reflecting layer, an optical information recording layer and a super-resolution layer which are formed on a substrate; a pickup for reading and writing optical information from/to the optical information recording medium; and a motor for driving and rotating the optical information recording medium. The super-resolution layer has a wavelength λg corresponding to band gap energy Eg in a stationary state and a difference $\Delta\lambda=\lambda-\lambda g$ from a wavelength λ of a laser beam to be irradiated on the optical information recording medium for information read/write is more than −100 nm to less than 60 nm. Moreover, a transmittance $T_0$ of the material in the stationary state at the wavelength λ changes to a transmittance T, so that an expression $\Delta T=|T-T_0|/T_0\times100$ may become over 10%. According to such condition, the optical information recording and reproducing apparatus includes the recording medium formed of a metal oxide or semiconducting compound material.

The conditions of Δλ and ΔT are achieved by forming the super-resolution layer with at least one metal oxide selected from $Fe_2O_3$, NiO, CoO, ZnO, $Cr_2O_3$, $CeO_2$, MnO, $SiO_2$, $TiO_2$, MgO, CuO, BaO, $Y_2O_3$ and CdO. The conditions are also achieved by forming the super-resolution layer with least one compound selected from ZnS—ZnSe, GaN—InN, ZnS, GaN and ZnSe.

In the optical information recording medium and the optical information recording and reproducing apparatus in accordance with the present invention, the film thickness of the super-resolution layer is desired to be 20 nm or more and 100 nm or less.

In accordance with another aspect of the present invention, there is provided a manufacturing method of an optical information recording medium having a super-resolution layer, in which the super-resolution layer is formed of at least one metal oxide selected from $Fe_2O_3$, NiO, CoO, ZnO, $Cr_2O_3$, $CeO_2$, MnO, $SiO_2$, $TiO_2$, MgO, CuO, BaO, $Y_2O_3$ and CdO, by sputtering using sputtering gas containing oxygen in a gas flow ratio of 2% or more and less than 0.20%.

The present invention is especially effective for increasing the capacity of an optical information recording medium on which information is recorded with the irradiation with a short-wavelength laser beam having a wavelength of 405 nm or less.

As will be described in the following embodiments, the effects of the present invention were confirmed regarding super-resolution layers formed of various oxides ($Fe_2O_3$, NiO, CoO, ZnO, $Cr_2O_3$, etc.), super-resolution layers formed of a mixture of $Fe_2O_3$ and one selected from $Cr_2O_3$, $CeO_2$, MnO, ZnO, NiO, CoO, MgO, CuO, BaO, $Y_2O_3$ and CdO, super-resolution layers formed of a mixture of $Fe_2O_3$, $SiO_2$ and $TiO_2$, and super-resolution layers formed of ZnS—ZnSe, GaN—InN, ZnS, GaN and ZnSe.

The optical information recording media as the target of the present invention are those comprising at least a reflecting layer, an optical information recording layer and a super-resolution layer which are formed on a substrate, therefore, optical information recording media further comprising other layers, such as a protective layer, are also included in the scope of the present invention. The present invention does not restrict the order of stacking of the reflecting layer, the optical information recording layer and the super-resolution layer.

In accordance with another aspect of the present invention, there is provided an optical information recording medium comprising at least a reflecting layer, an optical information recording layer, a super-resolution layer and a protective layer which are formed on a substrate. In the optical information recording medium, the super-resolution layer is a thin layer whose optical constant changes nonlinearly due to a red shift of its band gap when heated by irradiation with a laser beam for information read/write. The super-resolution layer is made of solid solution, compound or mixture of metal oxides containing two or more types of metal ions of the same valence. Ion radius unconformity $\Delta R=|(RM_i-RM_j)/RM_j|$ between ion radii $RM_i$ and $RM_j$ of two types of metal ions $M_i$ and $M_j$ arbitrarily selected from the two or more types of metal ions is 8% or less. The difference $\Delta E=Eg-E$ between band gap energy Eg of the mixture of the metal oxides and energy E corresponding to a wavelength of the laser beam is 0.4 eV or more and 1.4 eV or less.

In accordance with another aspect of the present invention, there is provided an optical information recording medium comprising at least a substrate, a reflecting layer, an optical information recording layer, a super-resolution layer and a protective layer, in which the super-resolution layer contains $Fe_2O_3$ and $Ga_2O_3$. Moreover, the super-resolution layer contains $Fe_2O_3$ in an amount between 20% and 55% and $Ga_2O_3$ in an amount between 45% and 80%.

Preferably, the optical information recording medium of the present invention further comprises a heat-absorbing layer. The heat-absorbing layer may be made of material selected from Bi, Mn, Zr, Cr, Co—Cr—Zr based alloy and Ge—Sb—Te based alloy. It is also possible to let the super-resolution layer contain heat-absorbing material dispersed therein. The heat-absorbing material may be selected from Bi, Mn, Zr, Cr, Co—Cr—Zr based alloy and Ge—Sb—Te based alloy.

The optical information recording layer is an information-writable thin layer formed over the substrate or a record pattern directly written on the substrate.

In accordance with another aspect of the present invention, there is provided an optical information recording and reproducing apparatus comprising at least a pickup for reading and writing optical information from/to an optical information recording medium and a spindle motor with a spindle for supporting, driving and rotating the optical information recording medium. The optical information recording medium at least includes a substrate, a reflecting layer, an optical information recording layer, a super-resolution layer and a protective layer. The super-resolution layer is a thin layer whose optical constant changes nonlinearly due to a red shift of its band gap when heated by irradiation with a laser beam for information read/write. The super-resolution layer is made of solid solution, compound or mixture of metal oxides containing two or more types of metal ions of the same valence. Ion radius unconformity $\Delta R=|(RM_i-RM_j)/RM_j|$ between ion radii $RM_i$ and $RM_j$ of two types of metal ions $M_i$ and $M_j$ arbitrarily selected from the two or more types of metal ions is 8% or less. The difference $\Delta E=Eg-E$ between band gap energy Eg of the mixture of the metal oxides and energy E corresponding to a wavelength of the laser beam is 0.4 eV or more and 1.4 eV or less.

In accordance with another aspect of the present invention, there is provided an optical information recording and reproducing apparatus comprising at least a pickup for reading and writing optical information from/to an optical information recording medium and a spindle motor with a spindle for supporting, driving and rotating the optical information recording medium, in which the optical information recording medium at least includes a substrate and a reflecting layer, an optical information recording layer, a super-resolution layer and a protective layer which are formed on a recording surface of the substrate, and the super-resolution layer contains $Fe_2O_3$ and $Ga_2O_3$.

The optical information recording medium may include a heat-absorbing layer, or the super-resolution layer may contain heat-absorbing material dispersed therein.

The optical information recording medium in accordance with the present invention is equipped with a super-resolution layer having a band gap close to the energy of the laser beam applied to the medium. Since changes in the refractive index and the extinction coefficient caused by laser excitation are remarkable, significant changes in the refractive index and extinction coefficient can be achieved even with low laser output. Therefore, large storage capacity of the optical information recording medium can be attained with low power consumption of an optical information recording and reproducing apparatus.

In the optical information recording medium of the present invention, the change in transmittance caused by heating is remarkable, by which significant change in transmittance can be achieved even when the output of the laser is low and the temperature of the heated part of the medium is low. Therefore, strong super-resolution effect in an optical disc can be achieved and thereby an optical information recording medium attaining high storage capacity with low power consumption can be obtained.

Other objects, features and advantages of the present invention will become more apparent from the consideration of the following detailed description taken in conjunction with the accompanying drawings.

DETAILED DESCRIPTION OF THE EMBODIMENTS

Figure 1:
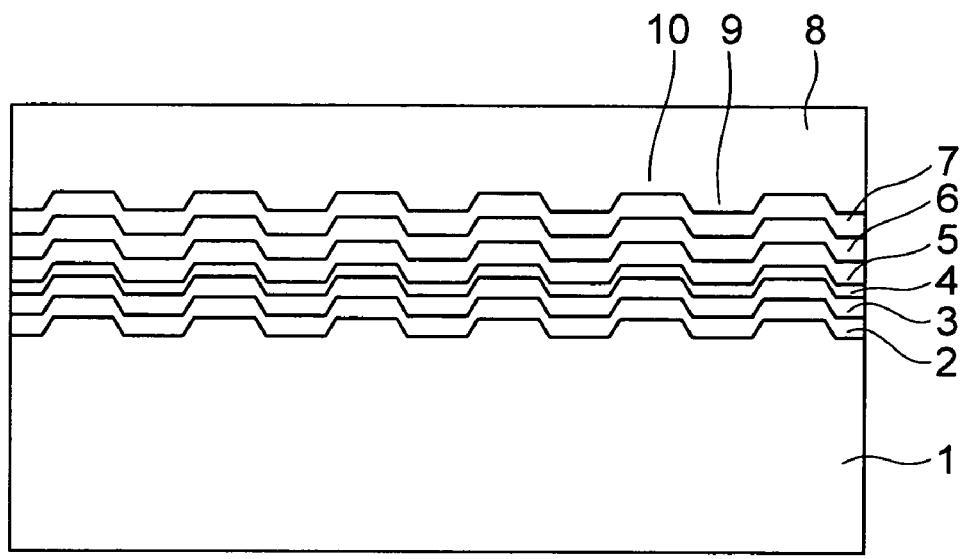
FIG. 1 is a schematic cross-sectional view showing an optical disc in accordance with an embodiment of the present invention.

Referring now to the drawings, a description will be given in detail of preferred embodiments in accordance with the present invention.

Materials having a band gap in the vicinity of 3.1 eV corresponding to a wavelength of 405 nm ($Fe_2O_3$, NiO, CoO, ZnO, $Cr_2O_3$, ZnS—ZnSe, CdS—ZnSe, GaN—InN) were deposited to form super-resolution layers of thicknesses between 20 nm and 100 nm. By the experiment, optical discs achieving large storage capacity and reducing power consumption for information read/write were obtained.

An optical disc having the optimum characteristics was obtained by using a thin layer composed of $45Fe_2O_3$-$55Ga_2O_3$ (mol %) as the super-resolution layer and a Bi-based thin layer as a heat-absorbing layer.

Embodiment 1

FIG. 1 is a schematic cross-sectional view of an optical disc in accordance with an embodiment of the present invention. In FIG. 1, a reference numeral "1" denotes a substrate, "2" denotes a reflecting layer, "3", "5" and "7" denote protective layers, "4" denotes an optical information recording layer, "6" denotes a super-resolution layer, "8" denotes a cover layer, "9" denotes a groove, and "10" denotes a land. A laser beam for information read/write is applied to the optical disc from its cover layer side to focus on the surface of the substrate, by which information can be recorded on the optical information recording layer 4 as well as reproducing the recorded information.

A laser beam having a wavelength of 405 nm, emitted by an InGaN-based compound semiconductor laser as the light source, was used for the experiment. While the semiconductor laser generally emits the laser beam continuously, a pulsed laser beam (pulsed by a pulse generator according to recording information) is applied to the optical disc. A lens having an NA of 0.85 was used for condensing the laser beam.

In this embodiment, a polycarbonate substrate 1.1 nm thick was used as the substrate 1. On the substrate, a track as a light guide groove is formed continuously from the inner radius of the disc to form a spiral. The track pitch in the radial direction was 310 nm. The track is formed by a concave part and a convex part. The level difference between the concave part and the convex part was 22 nm. The concave part corresponds to the groove 9 shown in FIG. 1, while the convex part corresponds to the land 10. Information was recorded in the groove 9 in this embodiment.

As the reflecting layer 2, an Ag-1% Au (wt. %) alloy layer was used. The reflecting layer 2 was deposited to a thickness of 50 nm by DC magnetron sputtering using pure Ar gas. As the protective layers 3, 5 and 7, $80ZnS$-$20SiO_2$ (mol %) amorphous layers were used. The protective layers 3, 5 and 7 were deposited by RF sputtering using pure Ar gas. The thickness of each protective layer 3, 5, 7 was designed to optimize reflectivity which is determined by the optical constants (refractive indices, extinction coefficients) and the thicknesses of all the thin layers. As the optical information recording layer 4, a GeSbTe-based phase change recording layer was used. The optical information recording layer 4 was deposited to a thickness of 20 nm by RF sputtering using pure Ar gas.

Figure 2:
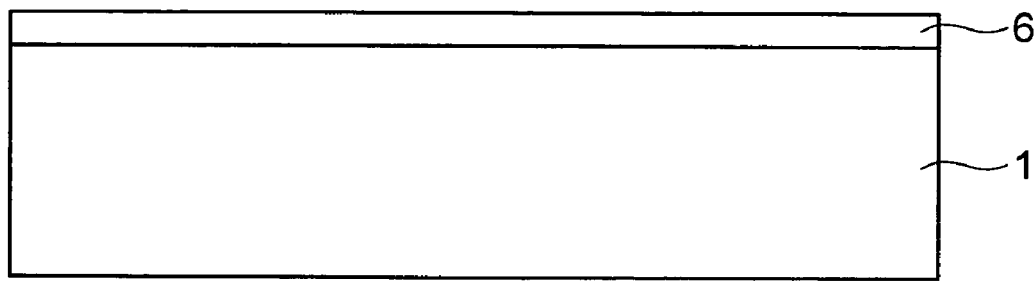
FIG. 2 is a schematic cross-sectional view of a thin layer sample formed for evaluating basic optical properties of each material for a super-resolution layer.

A single layer shown in FIG. 2 was formed in order to evaluate basic optical properties of each material for the super-resolution layer 6. Evaluations were made regarding the refractive index, the extinction coefficient, changes in the refractive index and the extinction coefficient caused by irradiation with an excitation laser beam, an optical band gap obtained from a spectral transmittance curve, and a change in the band gap caused by heating. In this experiment, a flat and smooth glass substrate with no track formed thereon was used as the substrate 1.

Figure 3:
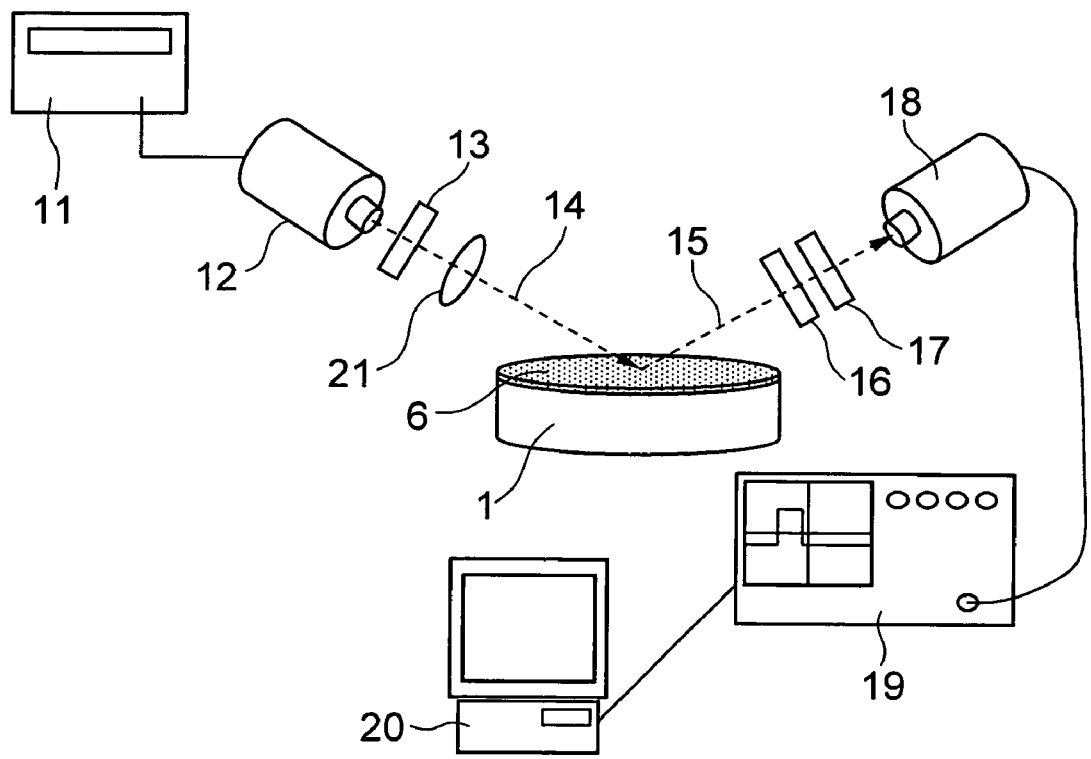
FIG. 3 is a schematic diagram of an optical system of test equipment used for obtaining the refractive index and extinction coefficient of the super-resolution layer.

The refractive index and extinction coefficient were measured by use of an ellipsometer equipped with a laser emitting a laser beam of a wavelength of 405 nm. FIG. 3 is a schematic diagram showing the ellipsometer used for the measurement of the refractive index and extinction coefficient. A semiconductor laser (λ=405 nm) was used as a light source 12. The laser beam was generated as a pulsed beam having desired intensity and duration by use of a pulse generator 11. The pulsed beam was polarized by a polarizer 13 into light whose plane of vibration is parallel to the surface of the sample (s-polarized light) and light whose plane of vibration is orthogonal to the surface of the sample (p-polarized light). The laser beam 14 was focused by a focusing lens 21 on the surface of the sample. The diameter of the focused laser beam spot was 0.6 μm.

In the irradiation of the sample with such polarized light, the reflectivities and phases of the s-polarized light and the p-polarized light change depending on the film thickness, the refractive index and the extinction coefficient of the sample. Therefore, the refractive index and the extinction coefficient of the sample can be estimated by previously measuring the film thickness and obtaining a reflectivity ratio and phases of the s-polarized light and the p-polarized light.

An analyzer 16 was placed on the side for receiving reflected light 15. The angle of the analyzer was changed (the analyzer was rotated) and the reflectivity ratio and the phases of the s-polarized light and the p-polarized light were obtained from the amount of reflected light at each analyzer angle (changed in units of 30 degrees). Since proper analysis becomes impossible when too much light exceeding a permissible light amount enters a photoreceptor 18, the amount of the reflected light entering the photoreceptor was regulated by placing a filter 17 suitable for the intensity of each pulsed beam.

The measurement of the reflected light 15 was carried out every 2 ns by time-splitting the light lead into the photoreceptor 18 by a digital oscilloscope 19. The measurement was started at a point 50 ns before the incidence of each light pulse and continued till a point 100 ns after the generation of the pulse. Since precise data can not be obtained by one-time measurement due to a low S/N ratio caused by variations of the laser and the photoreceptor and electrical noise, 128 times of measurement were accumulated and averaged by a computer 20 in charge of control.

Figure 4A:
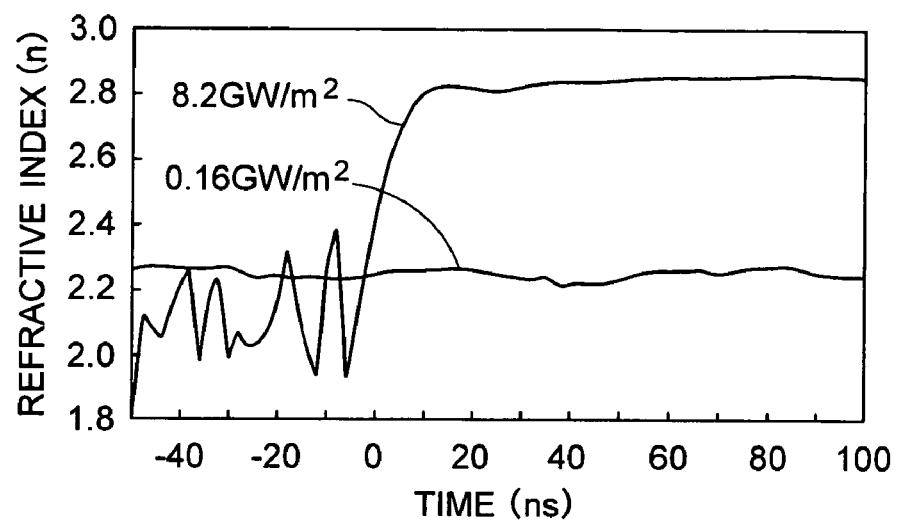
FIGS. 4A and 4B are graphs showing time-variations of the refractive index and extinction coefficient of the super-resolution layer.
Figure 4B:
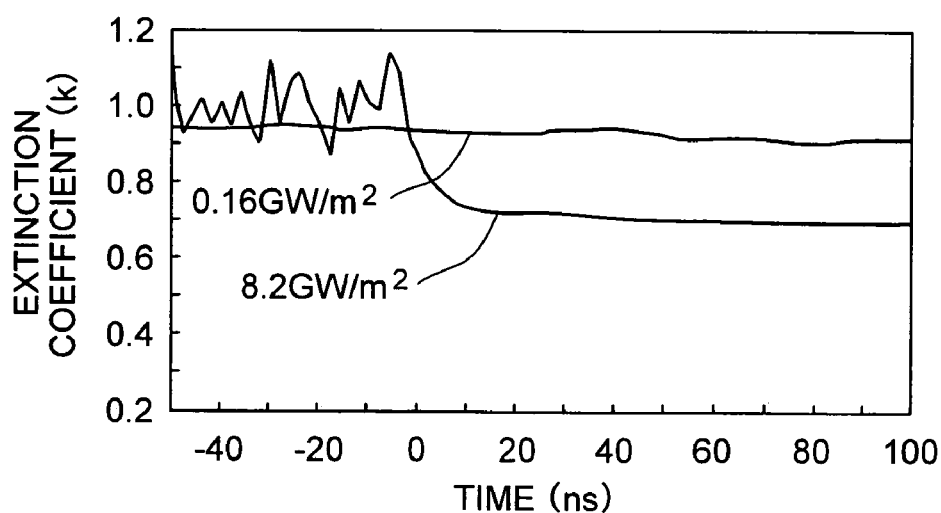

FIGS. 4A and 4B show time-variations of the refractive index and the extinction coefficient of an $Fe_2O_3$ thin layer caused by the pulse irradiation. The thickness of the $Fe_2O_3$ thin layer was 70 nm. The horizontal axes of the graphs represent time [ns], in which the pulse rises at time 0. The refractive index and extinction coefficient were 2.27 and 0.92 respectively when the laser beam intensity was kept constant at 0.16 $GW/m^2$ with no incidence of a pulse, while they changed to 2.81 and 0.70 respectively due to the incidence of a pulse (8.2 $GW/m^2$) upon the sample.

Subsequently, similar measurement was carried out changing the thickness of the $Fe_2O_3$ thin layer and thereby variations $\Delta n$ and $\Delta k$ of the refractive index and the extinction coefficient with respect to the film thickness were obtained. The variations $\Delta n$ and $\Delta k$ were determined by the following expressions:

$$\Delta n = (n-n_0)/n_0 \times 100$$

$$\Delta k = (k-k_0)/k_0 \times 100$$

where n and k denote the refractive indices with the incidence of the pulse while $n_0$ and $k_0$ denote those without the incidence of the pulse. Incidentally, the beam intensity with the incidence of the pulse was 8.2 $GW/m^2$ while that with the incidence of the pulse was 0.16 $GW/m^2$ as shown in FIGS. 4A and 4B. The film thickness of each thin layer was measured by previously sticking a resin tape (withstanding heat caused by the sputtering) as a mask on a part of the sample shown in FIG. 2, peeling the resin tape off after the deposition of the film (thin layer) to leave a level difference between the film surface and the substrate surface, and measuring the level difference with a contact type surface roughness meter.

The following Table 1 shows the film thickness, n, $n_0$, $\Delta n$, k, $k_0$ and $\Delta k$ of the deposited thin layer. Transmittance (T) at a wavelength of 405 nm obtained from measurement of transmittance by a spectrophotometer (described below) is also shown together with the above data.

beam varied depending on the film thickness. The change in each index/coefficient increased with the increase in the film thickness. The data $\Delta n$ and $\Delta k$ shown in Table 1 and FIGS. 5A and 5B indicate that both the refractive index and extinction coefficient exhibit little change when the film thickness is less than 20 nm while the data n and k change remarkably (both $\Delta n$ and $\Delta k$ exceeding 5% in absolute values) when the film thickness is 20 nm or more.

Even though the refractive index and extinction coefficient change satisfactorily with the irradiation with the pulsed laser beam when the film thickness is large enough, the change in each index/coefficient has a tendency to drop slightly after a peak existing at a film thickness of approximately 70 nm. When the film thickness is small, interaction of the sample with the incident beam is weak due to small light absorption, resulting in no remarkable change in n and k. On the other hand, when the film thickness is too large, the transmittance of the film drops, hampering photoexcitation of the whole film and saturating the changes in n and k.

Figure 13:
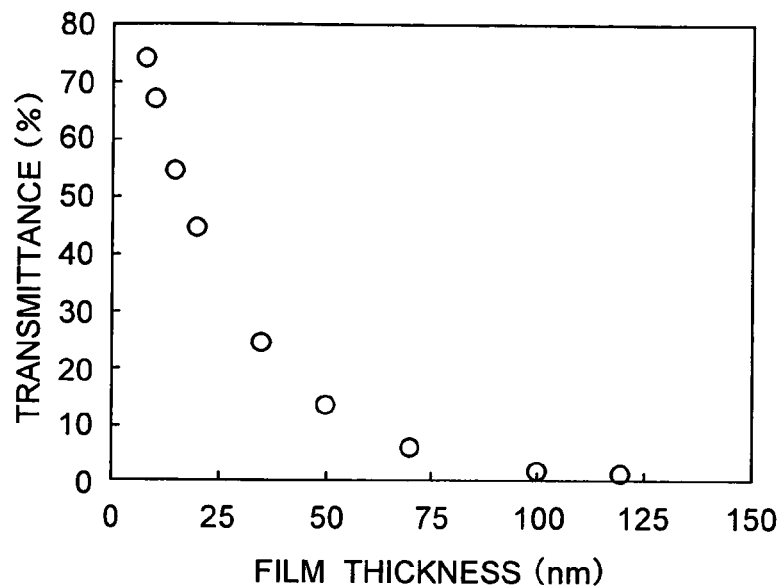
FIG. 13 is a graph showing the relationship between the film thickness and the transmittance of the super-resolution layer.

FIG. 13 shows the relationship between the film thickness and the transmittance shown in Table 1. The transmittance decreases with the increase of the film thickness and becomes extremely small (below 1.0%) at thicknesses exceeding 100 nm. Since enough signal strength can not be achieved with an optical disc manufactured to have the super-resolution layer of such low transmittance, the transmittance should be 1.0% or more. Therefore, it is desirable that the film thickness of the super-resolution layer be 100 nm or less.

From the above results, an optimum range of the film thickness of the super-resolution layer for achieving remarkable changes in the optical constants (n, k) and sufficient signal strength of an optical disc including the super-resolution layer is 20 nm or more and 100 nm or less.

Subsequently, the band gap of the $Fe_2O_3$ sample was evaluated using the change in the spectral transmittance and the transmittance curve. First, the way of determining the transmittance curve and calculating the band gap will be described below. The spectral transmittance was measured for a wavelength range between 200 nm and 2000 nm by use of a spectrophotometer U-4100 (Hitachi, Ltd.). In the spectrophotometer, light emitted by a white light source (tungsten lamp, deuterium lamp, etc.) is wavelength-separated by a spectroscope and applied to the sample. Reference light and light

TABLE 1

| SAMPLE NO. | MATERIAL | THICKNESS (nm) | $n_0$ | n | $\Delta n$ | $k_0$ | k | $\Delta k$ | T (%) |
|---|---|---|---|---|---|---|---|---|---|
| 1 | $Fe_2O_3$ | 7.5 | 2.24 | 2.25 | 0.446 | 0.89 | 0.88 | −1.124 | 74.1 |
| 2 | | 10 | 2.25 | 2.27 | 0.889 | 0.92 | 0.89 | −3.261 | 67.0 |
| 3 | | 15 | 2.26 | 2.29 | 1.327 | 0.91 | 0.88 | −3.297 | 54.9 |
| 4 | | 20 | 2.26 | 2.37 | 4.867 | 0.90 | 0.84 | −6.667 | 44.9 |
| 5 | | 35 | 2.24 | 2.5 | 11.607 | 0.91 | 0.82 | −9.890 | 24.7 |
| 6 | | 50 | 2.25 | 2.60 | 15.556 | 0.93 | 0.8 | −13.978 | 13.5 |
| 7 | | 70 | 2.27 | 2.81 | 23.789 | 0.92 | 0.70 | −23.913 | 6.1 |
| 8 | | 100 | 2.29 | 2.82 | 23.144 | 0.93 | 0.72 | −22.581 | 1.8 |
| 9 | | 120 | 2.25 | 2.69 | 19.556 | 0.91 | 0.75 | −17.582 | 0.8 |

Figure 5A:
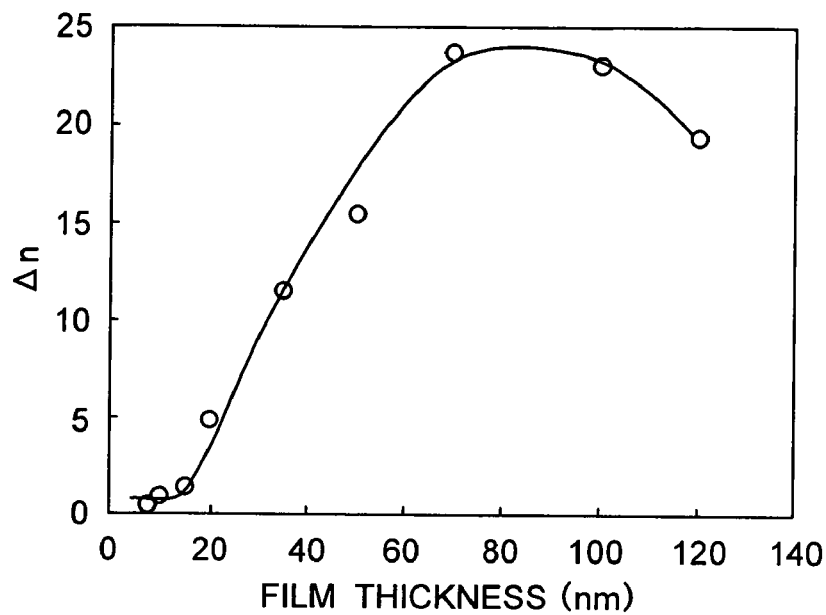
FIGS. 5A and 5B are graphs showing changes in the refractive index and extinction coefficient varying depending on the film thickness of the super-resolution layer.
Figure 5B:
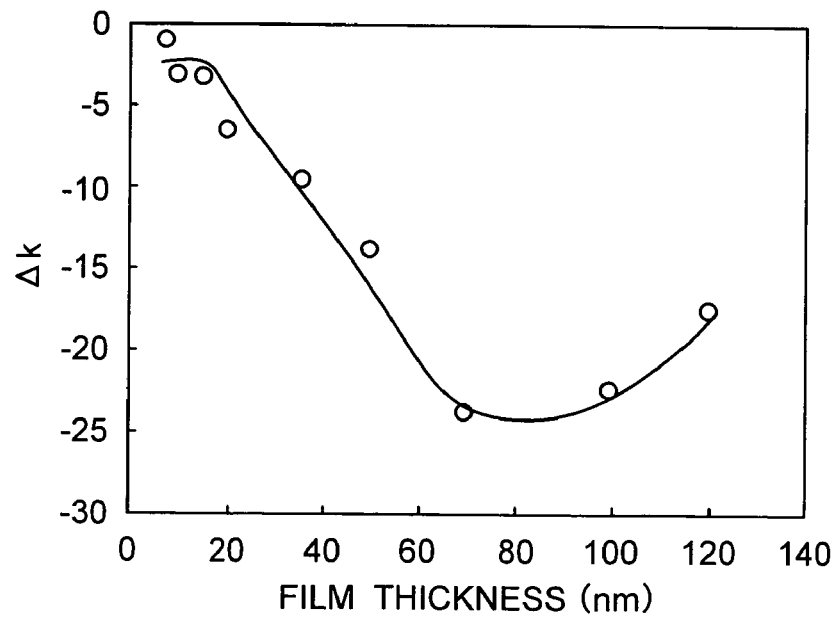

FIG. 5A shows the relationship between the film thickness and $\Delta n$ shown in Table 1. FIG. 5B shows the relationship between the film thickness and $\Delta k$ shown in Table 1. As shown in Table 1, both the refractive index ($n_0$) and the extinction coefficient ($k_0$) without the irradiation with the pulsed laser beam remained constant in all the thin layer samples. Meanwhile, the refractive index and the extinction coefficient (n, k) with the irradiation with the pulsed laser beam varied depending on the film thickness. passing through the sample are lead into a photomultimeter and the transmittance is obtained by calculating the intensity ratio.

Next, the way of obtaining the optical band gap from the determined spectral transmittance curve will be explained below. In the case of direct transition, the following relational expression (1) holds:

$$(\alpha h \nu)^2 = \alpha_0 (h \nu - E_g) \qquad (1)$$

where "Eg" denotes band gap energy, "hv" denotes energy of light, "α" denotes an absorption coefficient and "$α_0$" denotes a constant. The band gap energy Eg can be obtained by plotting $(αhv)^2$ against hv and extrapolating the linear part of the plot to αhv→0 (where Eg=hv). The relationship between the absorption coefficient α and the transmittance T is represented by the following relational expression (2):

$$T = \exp(-αd) \quad (2)$$

where "d" denotes the thickness [nm] of the film. The energy (hv [eV]) of light (corresponding to each wavelength (λ [nm])) has the following relationship (3) with the wavelength (λ [nm]).

$$E_g(\text{eV}) = \frac{1.2397}{λ(\text{nm})} \times 1,000 \quad (3)$$

Based on the above relationships, the optical band gap can be obtained by the following procedure. First, the transmittance T at each wavelength is obtained by experiment and the transmittance T at each wavelength is converted into the absorption coefficient α using the expression (2). Each wavelength λ of light is converted into energy using the expression (3). The relationship between $(αhv)^2$ and hv at each wavelength is plotted, and the optical band gap is obtained from the extrapolation point of the linear part to αhv→0.

Figure 6:
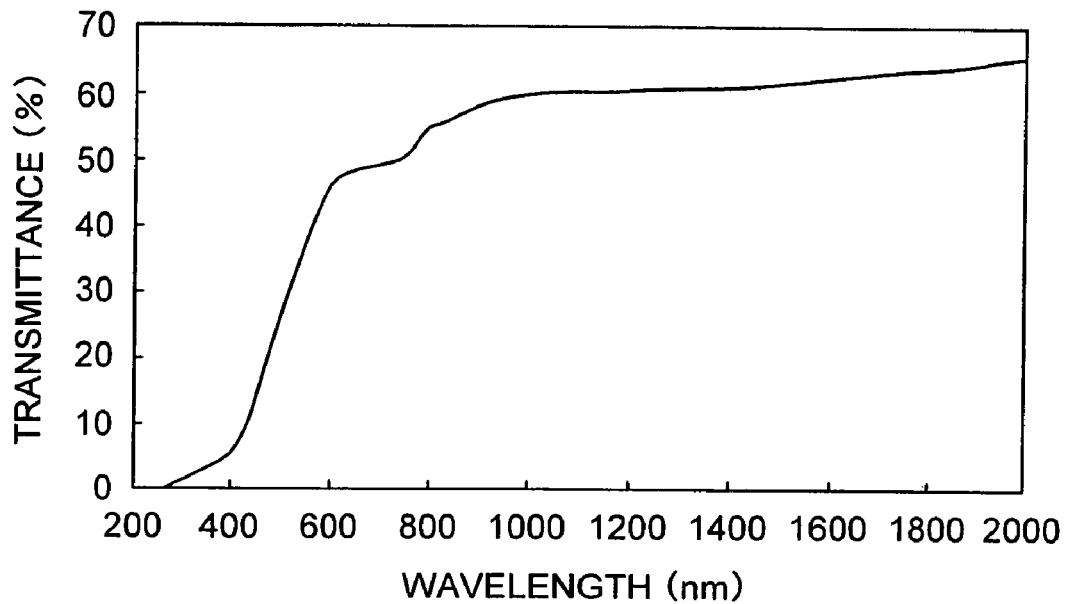
FIG. 6 is a graph showing spectral transmittance of the super-resolution layer.

FIG. 6 shows the spectral transmittance curve of an $Fe_2O_3$ single thin layer which was deposited to a thickness of 70 nm. As shown in FIG. 6, the $Fe_2O_3$ thin layer exhibits low transmittance at wavelengths shorter than 400 nm, while the transmittance gradually increases on the long-wavelength side of 400 nm. This indicates that the interaction of the thin layer material with the laser beam is strong at wavelengths in the vicinity of 400 nm (strong absorption of light). In the high-transmittance area, light easily passes through the thin layer and the interaction between the material and the light is weak. The $Fe_2O_3$ sample examined in the present invention has strong interaction with the 405 nm light and thus its optical constant changes easily. It is characteristic of the laser beam wavelength employed in this experiment to be very close to the wavelength of strong absorption by the material.

Figure 7:
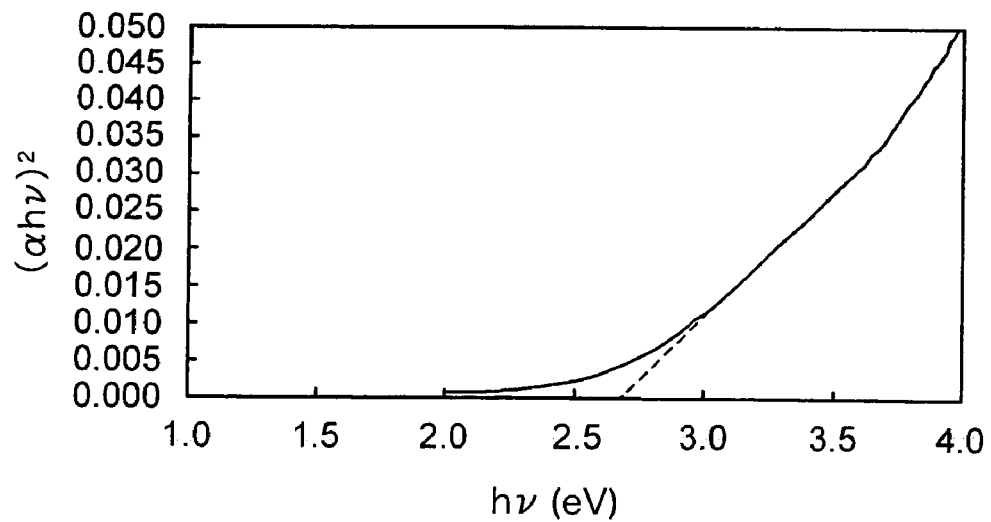
FIG. 7 is a graph showing an $h\nu$–$(\alpha h\nu)^2$ plot regarding the super-resolution layer and a band gap obtained from the plot.

Subsequently, the band gap Eg of the material was obtained using the expressions (1) to (3). FIG. 7 shows the hv-$(αhv)^2$ plot calculated from the data of FIG. 6 and the relational expression (1). As indicated by the dotted line in FIG. 7, the linear part was obtained from the hv-$(αhv)^2$ plot of the thin layer. From the extrapolation point of the linear part to αhv→0, a band gap Eg of 2.70 eV was obtained. The band gap energy 2.70 eV corresponds to a wavelength of 470 nm. Meanwhile, the energy of the 405 nm light is 3.1 eV, and thus the difference between the energy of the 405 nm light and the band gap energy of the material is approximately 0.4 eV. Thus, light having energy higher than (wavelength shorter than) the band gap is absorbed, causing the change in the optical constant. On the other hand, light having energy lower than the band gap is not absorbed, causing no change in the optical constant even when irradiating the material.

Figure 8:
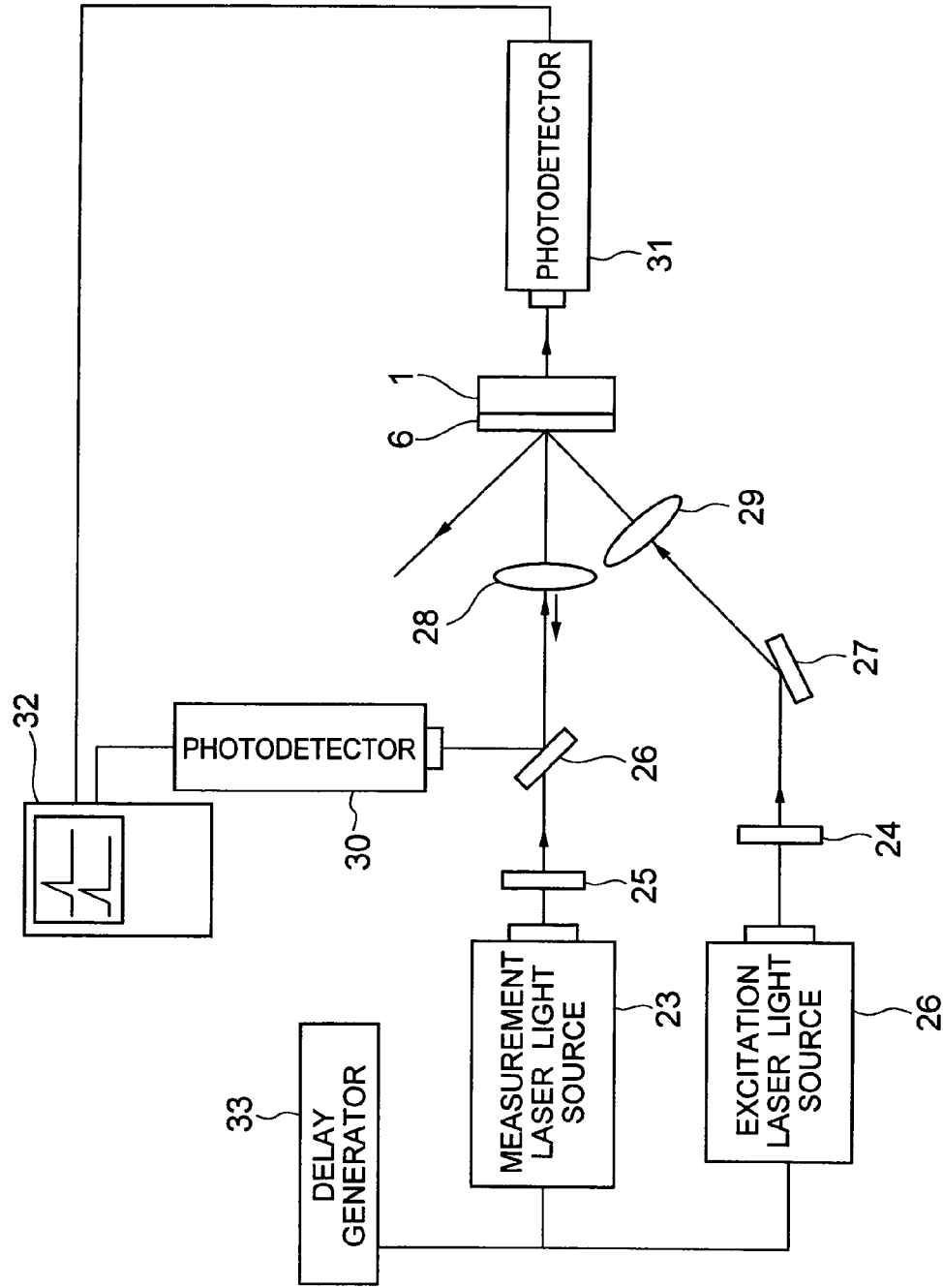
FIG. 8 is a schematic diagram showing an optical system for obtaining the time-variation of the transmittance of the super-resolution layer on the nanosecond order.

Subsequently, in order to clarify the process causing the change in the optical constant, wavelength dependence of the change in the optical constant was measured using a YAG-OPO laser shown in FIG. 8 capable of outputting nanosecond light pulses as a variable wavelength light source. In the present invention, YAG-OPO lasers with a pulse width of 5 ns, a wavelength range of 350 nm-2400 nm and a repetition frequency of 20 Hz were used as an excitation laser light source 22 and a measurement laser light source 23 shown in FIG. 8.

Since output power of each laser is extremely strong to cause damage to the sample, optical filters 24 and 25 were placed to attenuate the power and the laser beams were applied to the sample through the filters. A laser beam for excitation (excitation laser beam) enters a condensing lens 29 through a mirror 27 and is applied to the sample while being focused on the surface of the sample. Meanwhile, a laser beam for measurement (measurement laser beam) enters a condensing lens 28 through a beam splitter 26 and is applied to the sample vertically while being focused. The attenuation ratio of the optical filter 25 was set high in order to avoid excitation by the measurement laser beam. Further, for obtaining the change in the transmittance using the measurement laser beam, the beam from the measurement laser light source was separated by the beam splitter 26 into two 50% beams, letting one beam directly reach a photodetector 30 while letting the other beam reach a photodetector 31 through the sample. Electric current generated by each photodetector corresponding to the intensity of an input light signal was supplied to an oscilloscope 32. The light emission timing of the two lasers was controlled using an internal trigger mechanism of a delay generator 33 in order to give proper synchronization to the two beams. A delay time between the excitation beam and the measurement beam was changed from 0 ns to 50 ns and thereby the time response of the transmittance to the incidence of the excitation beam was evaluated.

Figure 9:
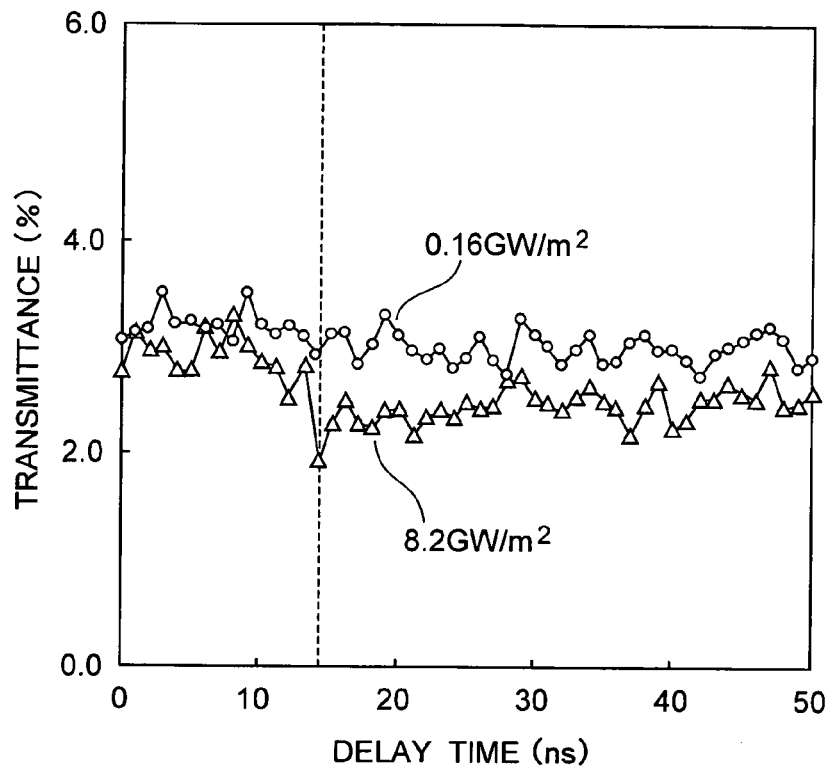
FIG. 9 is a graph showing the time-variation of the transmittance of the super-resolution layer on the nanosecond order.

FIG. 9 shows the time response of the transmittance of the $Fe_2O_3$ thin layer when both the wavelengths of the excitation beam and the measurement beam were set to 405 nm, in which the horizontal axis represents the delay time (corresponding to time difference between the excitation beam and the measurement beam). In this examination, the two beams irradiated the sample at the same time when the delay time was set to 14 ns. The transmittance remained almost constant around 3.0% when the excitation beam intensity was low (0.16 GW/m²). Meanwhile, when the excitation beam intensity was high (8.2 GW/m²), the transmittance exhibited a significant change of approximately 30% (maximum change at a delay time of 14 ns with a transmittance of 2.0%). The transmittance displayed a tendency to recover to its original value as the delay time was increased further.

Figure 10:
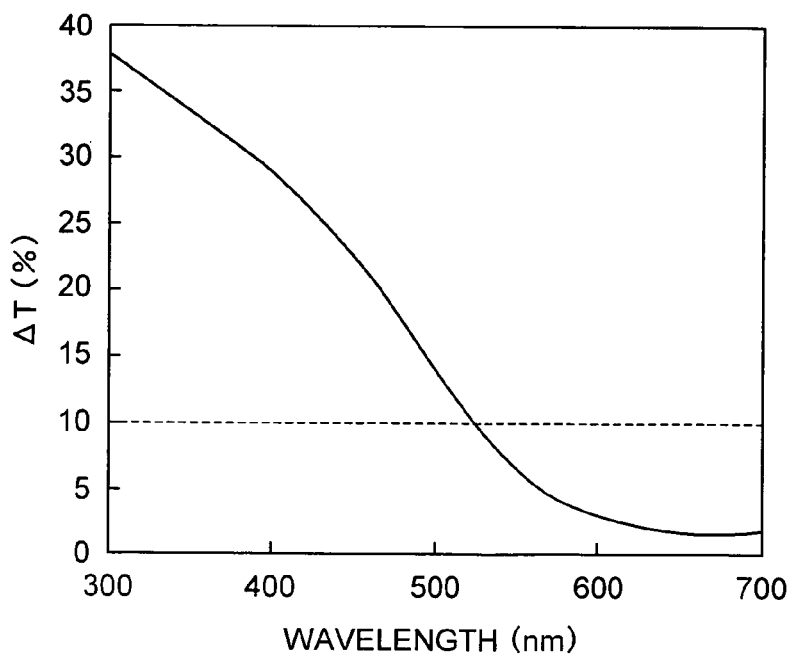
FIG. 10 is a graph showing the maximum value of specific transmittance difference at each excitation beam wavelength.

Similar measurement was carried out changing the wavelength of the excitation beam. FIG. 10 shows the maximum value of specific transmittance difference ΔT at each excitation beam wavelength. The specific transmittance difference ΔT was calculated by the following expression:

$$ΔT = |T - T_0|/T_0 \times 100$$

where "T" denotes transmittance corresponding to the aforementioned maximum change when the excitation beam intensity was 8.2 GW/m² and "$T_0$" denotes transmittance in the stationary state when the excitation beam intensity was weak (0.16 GW/m²). The wavelength of the measurement beam was set constant at 405 nm. As will be explained later, the specific transmittance difference ΔT is desired to be 10% or more since a large C/N ratio (as signal strength of the optical disc) has to be secured. As shown in FIG. 10, as the excitation beam wavelength gets shorter than 500 nm (slightly longer than 470 nm corresponding to the band gap of the $Fe_2O_3$ thin layer), the transmittance increases sharply, achieving a transmittance change (specific transmittance difference ΔT) of approximately 28% at 400 nm and approximately 38% at 300 nm. Further, it was found that the excitation beam wavelength has to be 530 nm or less in order to achieve a transmittance change of 10% or more.

The above examination clarified that a large transmittance change can be attained when the difference between the excitation beam wavelength ($\lambda$) and the wavelength ($\lambda g$) corresponding to the band gap energy is 60 nm or less ($\lambda - \lambda g \leq 60$ [nm]).

Figure 11:
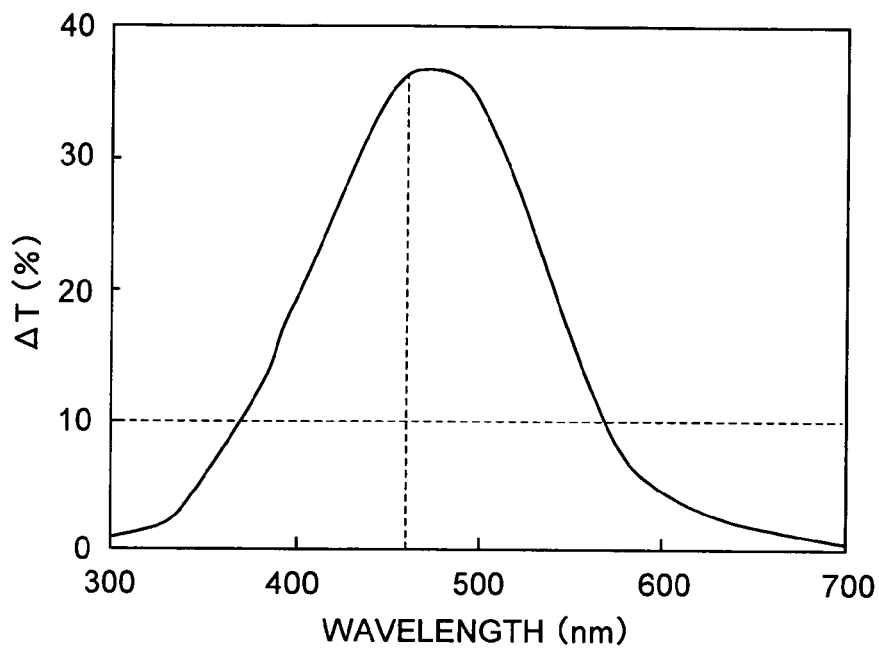
FIG. 11 is a graph showing the change in the transmittance when an excitation beam of a wavelength of 405 nm was used and the wavelength of a measurement beam was changed.

Subsequently, specific transmittance difference $\Delta T$ regarding the measurement beam was also measured by changing the measurement beam wavelength and fixing the excitation beam wavelength at 405 nm. FIG. 11 shows the specific transmittance difference $\Delta T$ at each measurement beam wavelength. In this case, $\Delta T$ hits its maximum in the vicinity of $\lambda g$ and drops both on the short-wavelength side and on the long-wavelength side. In this material, a specific transmittance difference $\Delta T$ of 10% or more can be achieved in a wavelength range from 370 nm to 570 nm, clarifying that a large specific transmittance difference of 10% or more can be attained when the difference between the wavelength employed ($\lambda$) and the wavelength ($\lambda g$) corresponding to the band gap energy of the material is between −100 nm and 100 nm ($-100 \leq \lambda - \lambda g \leq 100$ [nm]).

According to the above examination referring to FIGS. 10 and 11, the following relationships have to be satisfied between the employed wavelength $\lambda$ and the band gap wavelength $\lambda g$ corresponding to the band gap energy of the material. Regarding the excitation beam wavelength, excitation of the material is possible and a large transmittance change can be achieved when $\lambda - \lambda g \leq 60$ [nm]. When an excitation beam of a wavelength within the above range is used, a large transmittance change can be achieved by use of a measurement beam of a wavelength $\lambda$ within the range $-100 \leq \lambda - \lambda g \leq 100$ [nm]. When a single laser is used for both the excitation and measurement as in the case of optical discs, the wavelength difference $\lambda - \lambda g$ has to be set between −100 nm and 60 nm.

Figure 12:
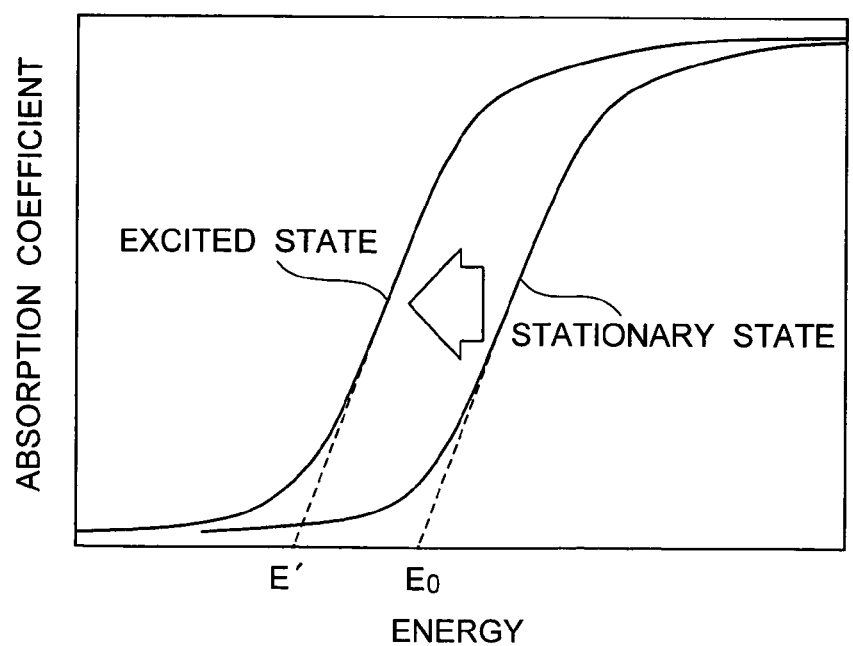
FIG. 12 is a schematic diagram showing a change in the band gap caused by irradiation with the excitation beam.

The cause of the transmittance change shown in FIG. 11 will be explained below referring to a schematic diagram of FIG. 12. When a laser beam satisfying the condition $-100 \leq \lambda - \lambda g \leq 60$ [nm] is applied to the material, the material absorbs the beam and the band gap energy shifts to the low-energy side. In this case, the absorption curve shifts to the low-energy side and thereby the absorption coefficient at each beam wavelength (corresponding to each energy) increases, causing a drop in the transmittance as shown in FIG. 9. When the shift of the curve shown in FIG. 9 has occurred, the largest change in the absorption coefficient is observed around the band gap energy Eg of the material in the stationary state, and the change in the absorption coefficient gets smaller both on the low-energy side and on the high-energy side. By the mechanism, the transmittance change profile shown in FIG. 11 is formed. The drop in the band gap energy by the laser irradiation can be attributed to band broadening by enhanced lattice vibration, caused by the heating of the material absorbing the laser beam.

Figure 14:
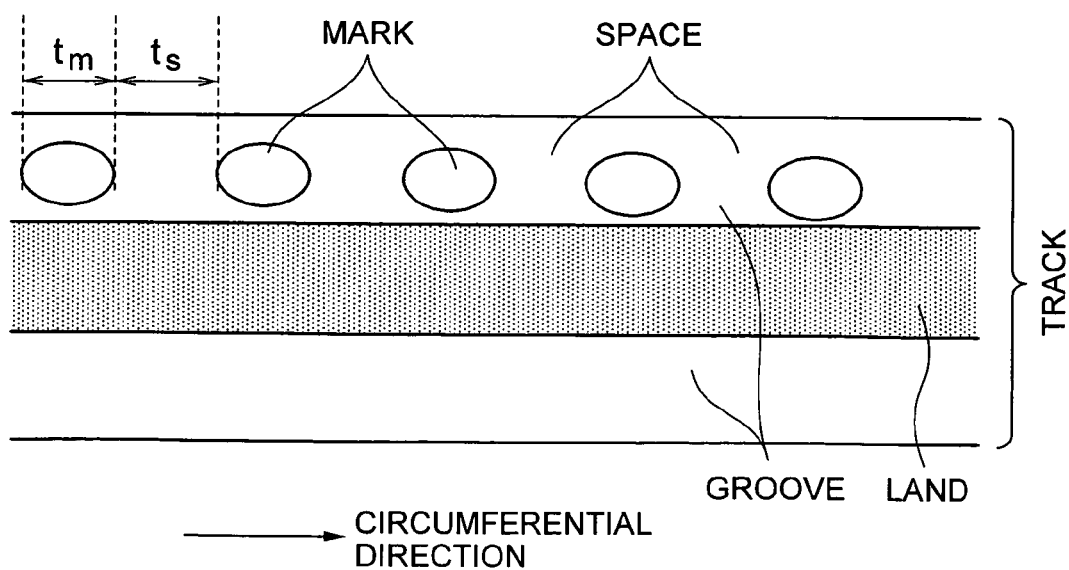
FIG. 14 is a schematic diagram showing record marks formed on an optical disc produced according to the present invention.

For the $Fe_2O_3$ thin layer which has been examined above, an optical disc shown in FIG. 1 was produced and its read/write characteristics were evaluated. The read/write characteristics evaluation was carried out as follows. A record pattern including recorded parts (marks) and unrecorded parts (spaces) alternately arranged at even intervals was recorded in the circumferential direction (along the track) of the disc as shown in FIG. 14, and the C/N ratio [dB] between the signal and noise obtained from the recorded marks was evaluated. The length of the mark or the length of the space (tm=ts) will hereinafter be called "mark length". In this embodiment, the recording was carried out only to the groove part, employing the difference of reflectivity between crystalline parts and amorphous parts of the GeSbTe-based alloy layer as the phase change recording layer shown in FIG. 1.

Figure 21:
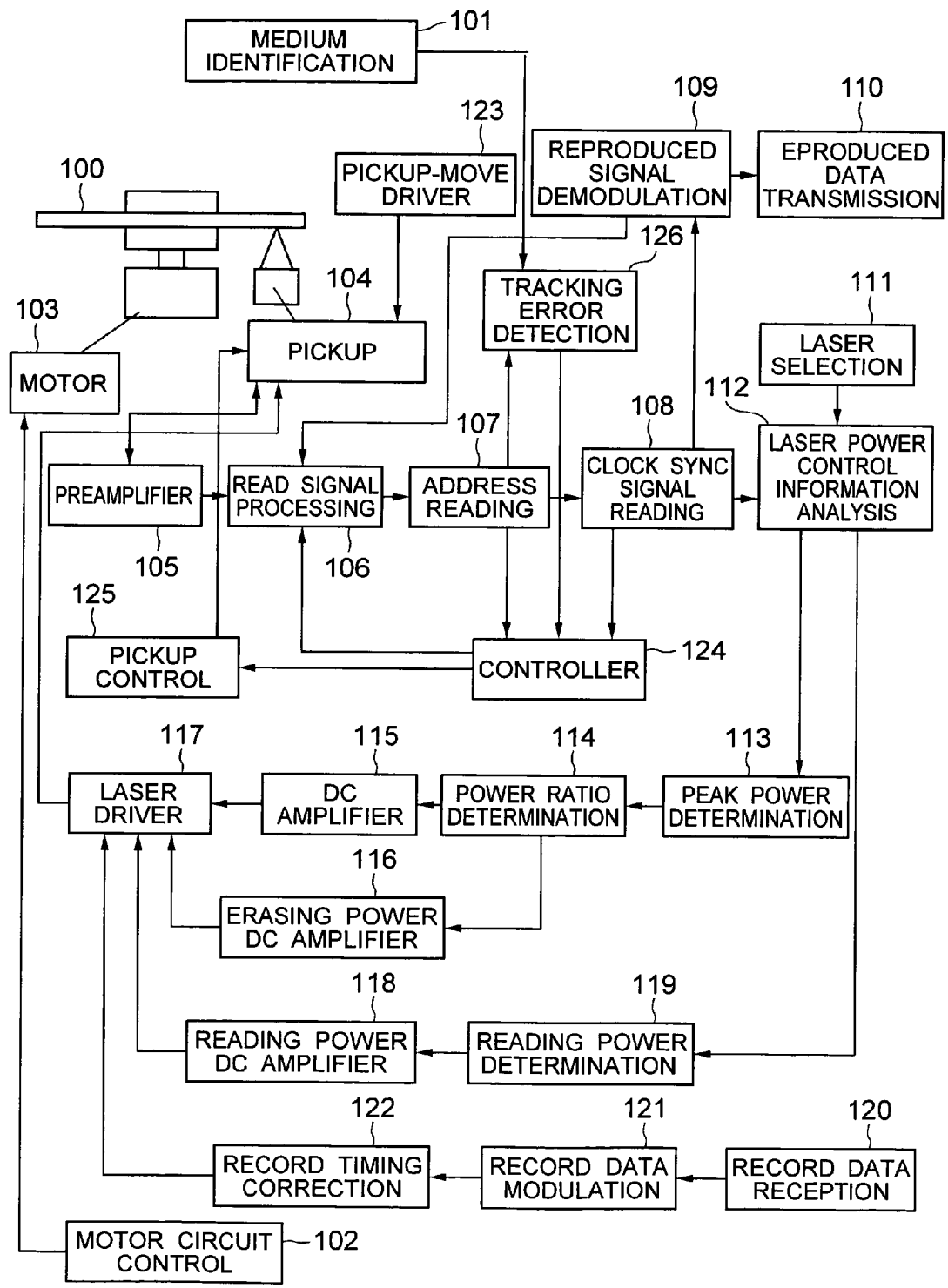
FIG. 21 is a conceptual diagram of an optical information recording and reproducing apparatus in accordance with an embodiment of the present invention.

An optical information recording and reproducing apparatus for reading/writing data from/to the optical information recording medium of the present invention was produced. FIG. 21 is a block diagram of the optical information recording and reproducing apparatus. The apparatus includes a medium identification unit 101 for identifying the type of an optical disc 100 as the optical information recording medium. The optical disc is temporarily clamped to a revolving mechanism which is directly or indirectly connected to the spindle of a motor 103 controlled by a motor circuit control unit 102. Information recorded on the optical disc is read out as an optical signal by a laser (as the light source) and a detecting unit (for detecting reflected light) which are installed in a pickup 104. Meanwhile, information is written on the optical disc by the light source in the pickup. The pickup is properly positioned in the track direction by a pickup-move driver 123.

The optical signal is processed by a preamplifier 105, a read signal processing unit 106, an address reading unit 107, a clock sync signal reading unit 108 and a reproduced signal demodulation unit 109, and reproduced data are transmitted to the outside of the apparatus by a reproduced data transmission unit 110. The reproduced data are outputted by a prescribed output unit like a display, speaker, etc., or processed by an information processing device like a personal computer.

The optical information recording and reproducing apparatus of this embodiment includes a laser selection unit 111 capable of selecting an arbitrary laser wavelength, in addition to circuitry for ordinary data read/write. Peak power to be employed is determined by a peak power determination unit 113 based on the output of the laser selection unit 111 and analysis by a laser power control information analysis unit 112. Reading power is determined by a reading power determination unit 119 similarly.

The output of the peak power determination unit 113 is supplied to a laser driver 117 via a power ratio determination unit 114 and through a recording power DC amplifier 115 and an erasing power DC amplifier 116, by which the light source in the pickup is controlled. Similarly, the output of the reading power determination unit 119 is inputted to the laser driver 117 via a reading power DC amplifier 118 and thereby the light source in the pickup is controlled. As actual lasers, semiconductor lasers (laser diodes) of wavelengths of 650 nm and 405 nm were installed in the pickup.

Since the focal point and focal depth change depending on the wavelength, the apparatus was configured to perform autofocusing depending on the laser selection. Further, the disc was provided with a condensing function layer while a tracking error detection unit 126 was equipped with an extra unit for high-density recording in order to cope with the narrowing tracking width, by which tracking operation adapted for each medium was realized. Information obtained by the tracking error detection unit 126 is sent to the pickup 104 via a controller 124 and a pickup control circuit 125. The apparatus was designed to perform the tracking operation automatically depending on the medium type, by the provision of the mechanism for identifying the medium type using the difference of reflectivity among various media.

In data recording, record data is inputted to the apparatus through a record data reception unit 120, modulated by a record data modulation unit 121, and inputted to the laser driver 117 via a record timing correction unit 122, by which the light source in the pickup 104 is controlled.

The configuration shown in FIG. 21 makes it possible to handle discs of different storage capacities (appearing due to the ongoing increase in the storage capacity, etc.) with a single apparatus, as well as realizing the compatible use of optical recording media for different wavelengths. Incidentally, the configuration of the optical information recording and reproducing apparatus may be modified appropriately depending on its purpose and application.

Figure 15:
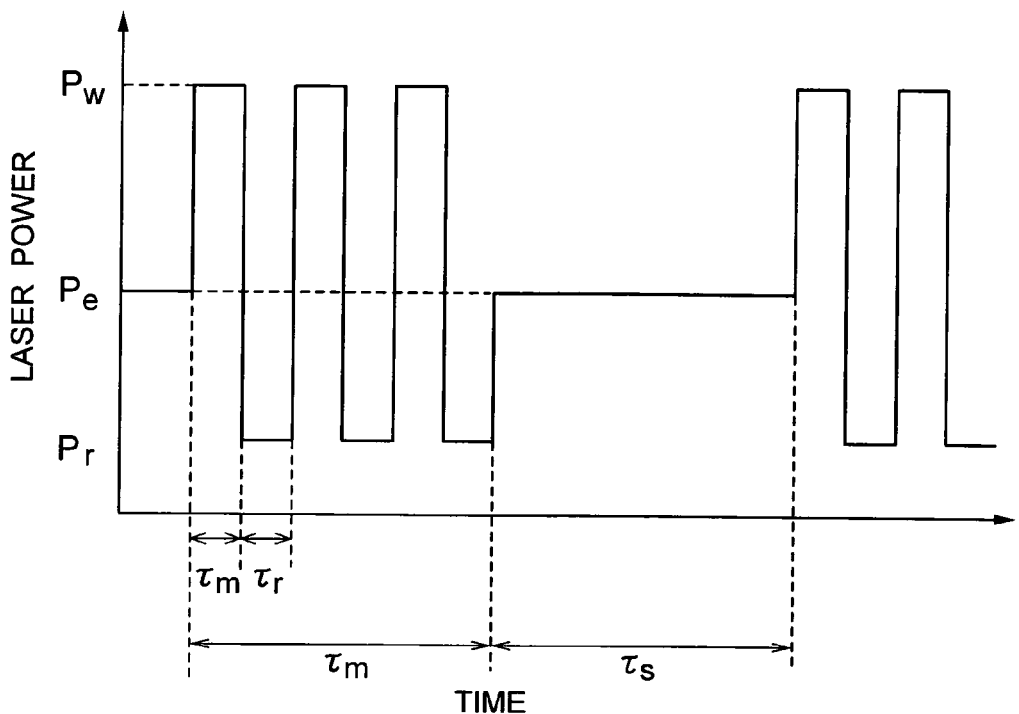
FIG. 15 is a graph showing an emission pattern of a writing pulsed laser beam employed for the formation of the record marks of FIG. 14.

FIG. 15 shows a signal waveform which was used for recording the aforementioned marks and spaces. In the recording of the marks, each mark was formed by repeating a pulse pair T (including a pulse of recording power Pw [mW] lasting for $\tau_w$ seconds and a pulse of low power Pr [mW] lasting for $\tau_r$ seconds) for a prescribed number of times. A "3T" case, repeating the pulse pair T for three times, is shown in FIG. 15. Each space was recorded by the emission of a beam of power Pe [mW] for $\tau_s$ seconds ($\tau_s = \tau_m$ (time length of the period 3T)). The pattern was recorded for a round of track at a constant radius. The C/N ratio was measured for various mark lengths by changing the mark length by varying $\tau_w$ and $\tau_r$. In this embodiment, the power Pw, Pr and Pe were set to 7.2 mW, 0.1 mW and 4.0 mW, respectively.

Figure 16:
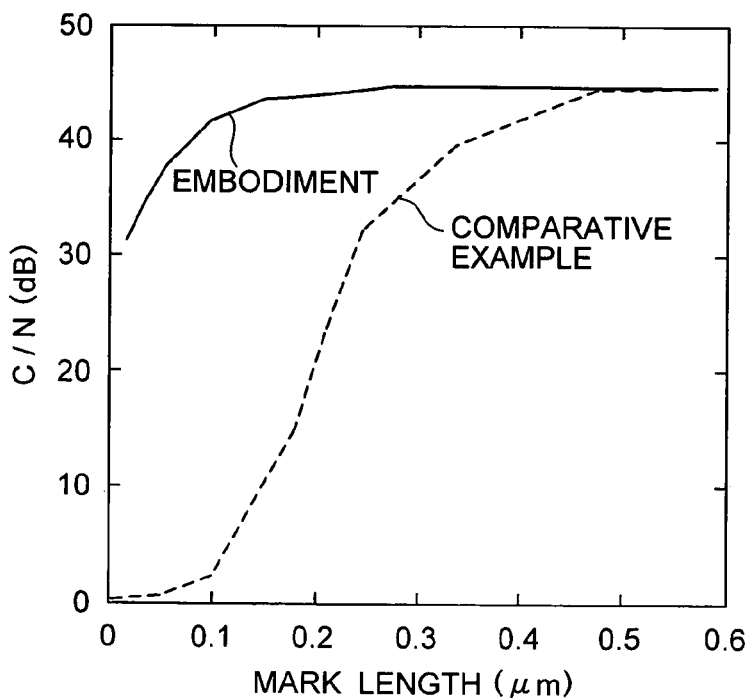
FIG. 16 is a graph showing the relationship between C/N ratio and mark length of an optical disc produced according to the present invention.

In this embodiment, the thickness of the $Fe_2O_3$ thin layer was set to 60 nm and the thickness of each $80ZnS-20SiO_2$ layer was adjusted so as to maximize the change in the reflectivity. The reflectivity of the optical disc when irradiated with the low power laser beam was 10.2% in this embodiment. FIG. 16 shows the relationship between the C/N ratio and the mark length, in which a result for an optical disc having no super-resolution layer (as a comparative example) is also shown. In the experiment, the laser power for reproduction was set to 1 mW and the linear velocity of revolution was set to 10 m/s. As shown in FIG. 16, the comparative example with no super-resolution layer exhibits an extremely low C/N ratio (a few dB) when the mark length is 0.05 μm, for example. Meanwhile, the optical disc of this embodiment achieves a high C/N ratio of approximately 36 dB. As above, the optical disc equipped with the super-resolution layer in accordance with the present invention was found to deliver a high C/N ratio even with extremely small record marks.

Figure 17:
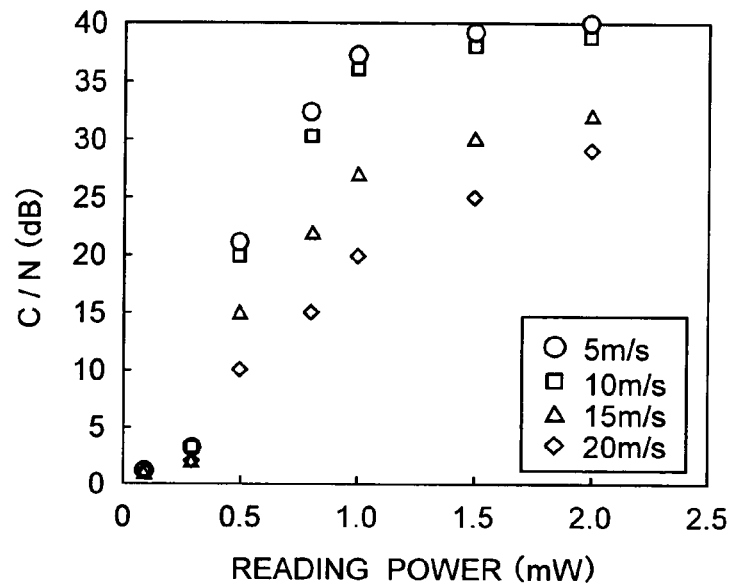
FIG. 17 is a graph showing reading power dependence of the C/N ratio of the optical disc according to the present invention at a mark length of 0.05 μm.

Subsequently, the behavior of the C/N ratio was studied by changing the reading laser power and the linear velocity of revolution. FIG. 17 shows the behavior of the C/N ratio against the reading laser power at a mark length of 0.05 μm. It was found that the C/N ratio increases with the increase of the reading power at every linear velocity. High C/N ratio was obtained especially when the reading power was 0.5 mW or more. The C/N ratio behaved similarly at linear velocities of 5 m/s and 10 m/s. Meanwhile, at linear velocities of 15 m/s or higher, the C/N ratio had a tendency to increase less with the increase of the reading power. This may be caused by an insufficient temperature rise due to shorter irradiation time of each mark in consequence of the increase of the linear velocity of revolution.

Therefore, it is desirable that the linear velocity of revolution be set at 10 m/s or less in the present invention.

Embodiment 2

Similar examination was carried out for other transition metal oxides. The following Table 2 shows the composition of super-resolution layers and oxygen gas flow ratios (in the whole gas) which were examined, together with the band gap energy Eg, the band gap wavelength λg corresponding to the band gap energy Eg, the difference (λ−λg) between the measurement wavelength λ and the band gap wavelength λg, the specific transmittance difference ΔT at the wavelength 405 nm, and the C/N ratio obtained by producing the optical disc shown in FIG. 1 and reading 0.05 μm pits. The oxygen gas flow ratio denotes the ratio of an oxygen gas flow (flow of oxygen gas) to a total gas flow (flow of the whole gas as a mixture of oxygen gas and Ag gas as the main deposition gas) in units %.

TABLE 2

| SAMPLE NO. | SUPER-RESOLUTION LAYER COMPOSITION (MOLAR RATIO) | OXYGEN FLOW RATIO IN GAS (%) | $E_g$ (eV) | $\lambda_g$ (nm) | $\lambda - \lambda_g$ (nm) | ΔT (%) | C/N (dB) |
|---|---|---|---|---|---|---|---|
| 10 | $Fe_2O_3$ | 0 | 2.70 | 459 | 54 | 12.8 | 35 |
| 11 | $Fe_2O_3$ | 5 | 2.71 | 457 | 52 | 13.7 | 36 |
| 12 | $Fe_2O_3$ | 10 | 2.69 | 461 | 56 | 12.0 | 34 |
| 13 | $Fe_2O_3$ | 20 | 2.70 | 459 | 54 | 12.8 | 35 |
| 14 | NiO | 0 | 3.00 | 413 | 8 | 35.9 | 40 |
| 15 | NiO | 5 | 2.98 | 416 | 11 | 34.5 | 41 |
| 16 | NiO | 10 | 2.95 | 420 | 15 | 32.4 | 40 |
| 17 | NiO | 20 | 2.97 | 417 | 12 | 33.8 | 41 |
| 18 | CoO | 0 | 3.51 | 353 | −52 | 24.4 | 38 |
| 19 | CoO | 5 | 3.52 | 352 | −53 | 24.1 | 38 |
| 20 | CoO | 10 | 3.54 | 350 | −55 | 23.5 | 37 |
| 21 | $Co_3O_4$ | 20 | 2.04 | 608 | 203 | 1.0 | 4 |
| 22 | ZnO | 0 | 3.20 | 387 | −18 | 34.7 | 41 |
| 23 | ZnO | 5 | 3.20 | 387 | −18 | 34.7 | 42 |
| 24 | ZnO | 10 | 3.21 | 386 | −19 | 34.3 | 42 |
| 25 | ZnO | 20 | 3.20 | 387 | −18 | 34.7 | 41 |
| 26 | $Cr_2O_3$ | 0 | 3.40 | 365 | −40 | 27.8 | 40 |
| 27 | $Cr_2O_3$ | 5 | 3.41 | 364 | −41 | 27.5 | 38 |
| 28 | $Cr_2O_3$ | 10 | 3.39 | 366 | −39 | 28.2 | 39 |
| 29 | $Cr_2O_3$ | 20 | 3.40 | 365 | −40 | 27.8 | 39 |

The band gap energy Eg was obtained by forming the single layer shown in FIG. 2 on a glass substrate and performing the same measurement and evaluation as those shown in FIGS. 6 and 7. The specific transmittance difference ΔT (transmittance change) was obtained by use of the device shown in FIG. 8 employing the wavelength 405 nm for both the measurement beam and the excitation beam. The excitation beam intensity was set at 8.2 $GW/m^2$. The C/N ratio was obtained by producing an optical disc similar to that of the first embodiment shown in FIG. 1, writing the record pattern shown in FIG. 15 on the disc so that the mark length will be 0.05 μm, and reading the recorded marks. The reading power and the linear velocity of revolution were set at 1.0 mW and 10 m/s, respectively.

The samples No. 10-No. 29 are thin layer samples and discs, in which various metal oxides ($Fe_2O_3$, NiO, CoO, ZnO, $Cr_2O_3$) were deposited as the super-resolution layer. The wavelengths λg of the material were approximately 460 nm ($Fe_2O_3$), 418 nm (NiO), 350 nm (CoO), 387 nm (ZnO) and 365 nm ($Cr_2O_3$). While the materials were deposited employing various oxygen flows in the sputtering gas, λg did not exhibit remarkable change dependent on the oxygen flow, except for a significant drop in λg seen in the sample No. 21.

The wavelength difference λ–λg was within a range between −100 nm and 60 nm in almost all the samples except for the sample No. 21. In this case, the samples exhibited very large specific transmittance differences ΔT between 10% and 39%. Excellent results were achieved also in the examination of optical discs, with high C/N ratios of 30 dB or more except for the sample No. 21.

If we focus on the oxygen flow ratio in gas, the band gap did not exhibit significant change except in CoO. In the case of CoO, the band gap energy dropped severely and no satisfactory result was obtained when the oxygen flow ratio in gas was 20%. This was caused by a chemical change of CoO into $Co_3O_4$. Although not shown in Table 2, it was found that oxygen flow ratio in gas exceeding 20% reduces the deposition rate significantly, which can deteriorate productivity of the optical discs while having little effect of improving film quality.

Figure 18:
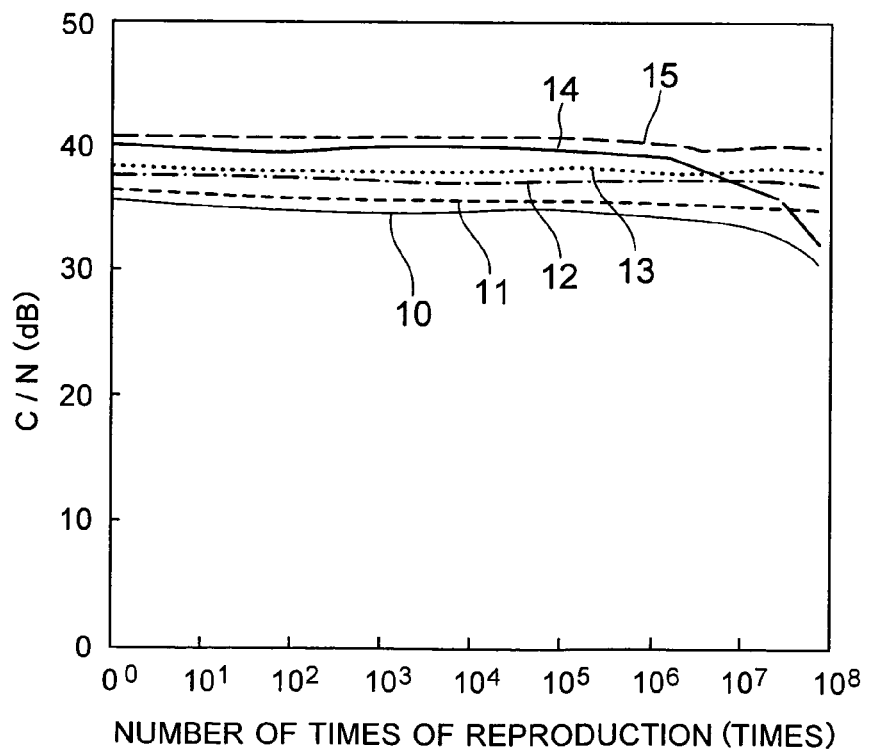
FIG. 18 is a graph showing the relationship between the C/N ratio and the number of times of reproduction when a record pattern (mark length: 0.05 μm) on the optical disc according to the present invention was read out with reading power of 1 mW.

The measurement of the C/N ratio shown in Table 2 was continued while revolving the disc for a long time and thereby the degree of degradation of C/N ratio was evaluated. FIG. 18 shows the relationship between the C/N ratio and the number of times of reproduction, in which results for optical discs employing the samples No. 10-No. 13 ($Fe_2O_3$) and the samples No. 14 and No. 15 (NiO) as their super-resolution layers are shown. Each of the optical discs exhibited substantially no degradation of C/N ratio for repetitive reproduction of $10^6$ times. However, after the number of repetitions exceeded $10^6$ times, degradation of C/N ratio was seen in optical discs employing the super-resolution layers of No. 10 and No. 14.

Both No. 10 and No. 14 are samples deposited with 0% oxygen gas flow. Therefore, degradation of output power seems to occur in cases where no oxygen gas is contained in the source gas. Other samples deposited with a certain oxygen flow did not show significant degradation of output power.

As above, optical discs with excellent durability can be obtained by setting the oxygen gas flow at 2% or more. With oxygen gas flow of 20% or more, the deposition rate drops significantly and little improvement of film quality is observed. Therefore, it is desirable that the oxygen gas flow be set at 2% or more and less than 20%.

Incidentally, the ZnO thin layers as No. 22-No. 25 in Table 2 were found to be less desirable for practical use than other thin layers. Film quality of the ZnO thin layers was unstable just after deposition and gradually changed in a laser irradiation process and a heating process.

Subsequently, super-resolution layers made of complex oxides were also examined. The results will be shown in the following Table 3.

TABLE 3

| SAMPLE NO. | SUPER-RESOLUTION LAYER COMPOSITION (MOLAR RATIO) | OXYGEN FLOW RATIO IN GAS (%) | $E_g$ (eV) | $λ_g$ (nm) | $λ – λ_g$ (nm) | ΔT (%) | C/N (dB) |
|---|---|---|---|---|---|---|---|
| 30 | $98Fe_2O_3—2Cr_2O_3$ | 0 | 2.70 | 459 | 54 | 12.8 | 31 |
| 31 | $90Fe_2O_3—10Cr_2O_3$ | 0 | 2.82 | 440 | 35 | 22.6 | 35 |
| 32 | $80Fe_2O_3—20Cr_2O_3$ | 0 | 2.94 | 422 | 17 | 31.6 | 41 |
| 33 | $98Fe_2O_3—2Cr_2O_3$ | 2 | 2.71 | 457 | 51 | 14.2 | 32 |
| 34 | $90Fe_2O_3—10Cr_2O_3$ | 2 | 2.85 | 435 | 28 | 26.0 | 36 |
| 35 | $80Fe_2O_3—20Cr_2O_3$ | 2 | 2.95 | 420 | 12 | 33.9 | 42 |
| 36 | $98Fe_2O_3—2Cr_2O_3$ | 20 | 2.73 | 454 | 45 | 17.4 | 33 |
| 37 | $90Fe_2O_3—10Cr_2O_3$ | 20 | 2.87 | 432 | 22 | 29.0 | 37 |
| 38 | $80Fe_2O_3—20Cr_2O_3$ | 20 | 2.97 | 417 | 6 | 36.8 | 45 |
| 39 | $95Fe_2O_3—5CeO_2$ | 0 | 2.75 | 451 | 46 | 17.0 | 32 |
| 40 | $95Fe_2O_3—5CeO_2$ | 2 | 2.76 | 449 | 44 | 17.8 | 33 |
| 41 | $95Fe_2O_3—5CeO_2$ | 20 | 2.77 | 448 | 43 | 18.7 | 34 |
| 42 | $95Fe_2O_3—5MnO$ | 0 | 2.95 | 420 | 15 | 32.4 | 41 |
| 43 | $95Fe_2O_3—5ZnO$ | 0 | 2.84 | 437 | 32 | 49.5 | 47 |
| 44 | $95Fe_2O_3—5SiO_2•TiO_2$ | 0 | 2.92 | 425 | 20 | 45.9 | 44 |
| 45 | $95Fe_2O_3—5NiO$ | 0 | 2.88 | 430 | 25 | 47.7 | 45 |
| 46 | $95Fe_2O_3—5CoO$ | 0 | 2.96 | 419 | 14 | 44.2 | 43 |
| 47 | $95Fe_2O_3—5MgO$ | 0 | 2.99 | 415 | 10 | 42.9 | 42 |
| 48 | $95Fe_2O_3—5CuO$ | 0 | 2.72 | 456 | 51 | 14.5 | 32 |
| 49 | $95Fe_2O_3—5BaO$ | 0 | 2.84 | 437 | 32 | 49.5 | 47 |
| 50 | $95Fe_2O_3—5Y_2O_3$ | 0 | 2.82 | 440 | 35 | 50.4 | 48 |
| 51 | $95Fe_2O_3—5CdO$ | 0 | 2.70 | 459 | 54 | 12.8 | 30 |

Each super-resolution layer shown in Table 3 was deposited by sputtering, by putting a corresponding amount of corresponding oxide chip on a $Fe_2O_3$ target. Quantitative chemical composition analysis was conducted by depositing each thin layer on a polyimide film, dissolving the thin layer by putting the whole film into aqua regia, and carrying out ICP-AES (Inductively Coupled Plasma Atomic Emission Spectroscopy). For other evaluation items, measurement was carried out in the same way as that of Table 2.

Samples No. 30-No. 38 are thin layer materials made by adding $Cr_2O_3$ to $Fe_2O_3$, in which λg decreased with the increase of the $Cr_2O_3$ content. The decrease in λg can be explained by the short λg of $Cr_2O_3$ shown in Table 2 and formation of mixed crystal of $Fe_2O_3$ and $Cr_2O_3$. Accordingly, λ–λg decreased and both ΔT and C/N improved significantly. In the deposition with different oxygen flow ratios, no significant change in λg was observed similarly to the result of Table 2 and both ΔT and C/N remained excellent. A degradation test similar to that shown in FIG. 18 also exhibited excellent results, in which no degradation was seen even after repetitive reproduction of $10^6$ times in cases where the oxygen content was 2% and 20%. Therefore, also with these materials, the oxygen gas flow is desired to be 2% or more. However, with oxygen gas flow ratios of 20% or more, the deposition rate dropped extremely and no significant change from the 2% case was seen in optical properties of the optical disc. Therefore, setting the oxygen gas flow ratio at 20% or more is undesirable in that it causes deterioration of productivity. As above, it is desirable also with these materials that the oxygen gas flow be set at 2% or more and less than 20%.

Samples No. 39-No. 41 are materials containing rare-earth metal oxide $CeO_2$. The band gap wavelength λg became a little shorter due to the addition of $CeO_2$. With the increase of the oxygen flow, kg decreased slightly. All the samples No. 39-No. 41 showed satisfactory results, with specific transmittance differences ΔT of 17% or more and C/N ratios higher than 30 dB.

Samples No. 42-No. 51 are super-resolution layers in which various metal oxides (MnO, ZnO, $SiO_2$, $TiO_2$, NiO, CoO, MgO, CuO, BaO, $Y_2O_3$, CdO) are added to $Fe_2O_3$. Film deposition was carried out in pure Ar gas. The "$SiO_2.TiO_2$" in the sample No. 44 denotes oxide as a mixture of $SiO_2$ and $TiO_2$ in a molar ratio of 1:1. The addition of these materials caused a band gap shift and λg shifted to the short-wavelength side in every thin layer, achieving large specific transmittance differences ΔT and high C/N ratios.

As above, super-resolution layers achieving more excellent optical properties was successfully formed by adding various metal oxides ($Cr_2O_3$, $CeO_2$, MnO, ZnO, $SiO_2$, $TiO_2$, NiO, CoO, MgO, CuO, BaO, $Y_2O_3$, CdO) to $Fe_2O_3$, by which the manufacture of optical discs delivering high C/N ratios has become possible.

Subsequently, semiconducting compounds (ZnS—ZnSe, GaN—InN) were examined. The results will be shown in the following Table 4.

TABLE 4

| SAMPLE NO. | SUPER-RESOLUTION LAYER COMPOSITION (MOLAR RATIO) | $E_g$ (eV) | $λ_g$ (nm) | $λ - λ_g$ (nm) | ΔT (%) | C/N (dB) |
|---|---|---|---|---|---|---|
| 52 | Zns | 3.58 | 346 | −59 | 22.3 | 37 |
| 53 | 81ZnS—19ZnSe | 3.40 | 365 | −40 | 27.9 | 38 |
| 54 | 49ZnS—51ZnSe | 3.13 | 397 | −8 | 37.5 | 40 |
| 55 | 17ZnS—83ZnSe | 2.85 | 435 | 30 | 25.1 | 37 |
| 56 | GaN | 3.30 | 376 | −29 | 31.2 | 41 |
| 57 | 78GaN—22InN | 3.14 | 395 | −10 | 36.9 | 42 |
| 58 | 51GaN—49InN | 2.90 | 427 | 22 | 28.7 | 35 |
| 59 | 21GaN—79InN | 2.66 | 466 | 61 | 9.4 | 22 |
| 60 | InN | 2.50 | 496 | 91 | 1.1 | 6 |

First, the ZnS—ZnSe thin layers of No. 52-No. 55 will be explained below. In the deposition of the thin layers, sintered ZnSe chips (10 mm square×1 mm thick) were put on a ZnS target (152.4 mmφ) and the chemical composition was varied by changing the number of chips. By successively adding ZnSe to ZnS, a ZnS—ZnSe thin layer containing 80% ZnSe was obtained. Quantitative chemical composition analysis of each thin layer was conducted by previously depositing each thin layer on a polyimide film, dissolving the thin layer by putting the whole film into aqua regia, and carrying out ICP-AES. Pure Ar gas was used as the sputtering gas.

Figure 19:
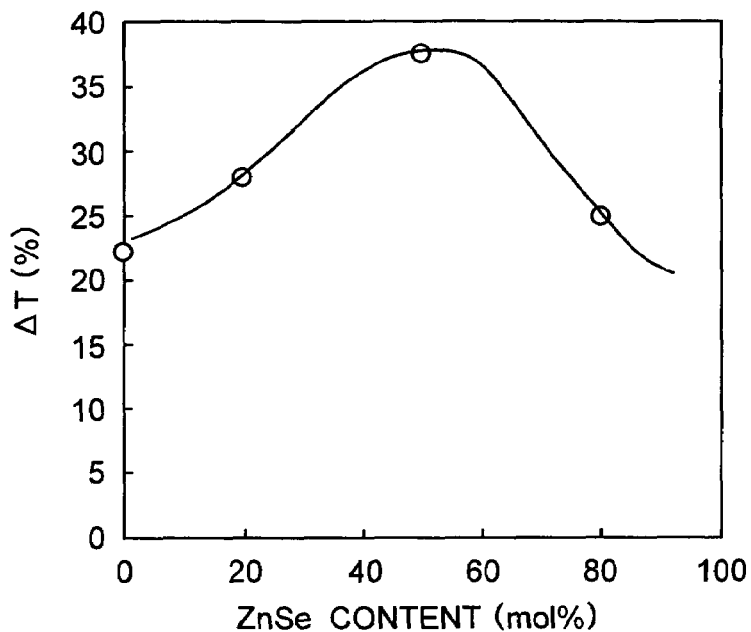
FIG. 19 is a graph showing the relationship between specific transmittance difference ΔT and the ZnSe content of ZnS—ZnSe super-resolution layers.

While the band gap wavelength λg of ZnS was 346 nm, λg shifted to the long-wavelength side with the increase of the ZnSe content, reaching λg=435 nm in the 20ZnS-80ZnSe sample. With the change in the super-resolution layer composition, λ-λg also changed and thereby the specific transmittance difference ΔT also changed. FIG. 19 shows the relationship between the specific transmittance difference ΔT and the ZnSe content of the ZnS—ZnSe thin layers. As shown in FIG. 19, all the ZnS—ZnSe thin layers achieved large specific transmittance differences ΔT above 10% regardless of the chemical composition, by which optical discs delivering high C/N ratios of 30 dB or higher was produced successfully.

Next, samples No. 55-No. 60 employing GaN—InN semiconducting compound as the super-resolution layer will be explained below. The deposition of the thin layers was conducted by putting In chips (10 mm square×1 mm thick) on a Ga target (152.4 mmφ) and using pure $N_2$ gas as the sputtering gas. Since Ga melts at approximately 38° C., sputtering power was kept within 100 W. In order to prevent interfusion of oxygen, a getter containing $P_2O_5$ was provided to the gas inlet. The deposition of the pure InN layer was carried out by sputtering of an In target, using $N_2$ sputtering gas similarly, by which an InN single layer was obtained. The chemical composition analysis was carried out similarly to the case of ZnS—ZnSe thin layers.

Figure 20:
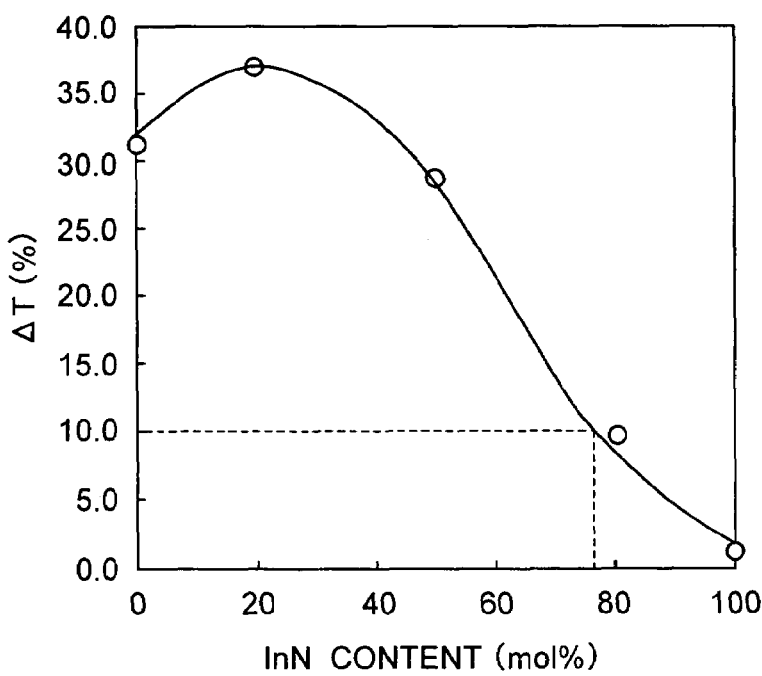
FIG. 20 is a graph showing the relationship between specific transmittance difference ΔT and the InN content of GaN—InN super-resolution layers.

Similarly to the ZnS—ZnSe thin layers, the GaN—InN thin layers exhibited an increase in λg with the increase of the InN content. The specific transmittance difference ΔT also changed accordingly. FIG. 20 shows the relationship between the specific transmittance difference ΔT and the InN content of the GaN—InN thin layers. The specific transmittance difference ΔT decreased with the increase of the InN content, falling to 10% at 76 mol %. Still higher InN contents decreased ΔT below 10%, proving to be undesirable. From the above results, the InN content in the GaN—InN thin layer is desired to be 76 mol % or less.

While examples of production of optical discs of the type shown in FIG. 1, allowing recording, reproduction and erasure of data, were described in the above embodiments, recording and reproduction of small record marks (mark length≈0.05 μm) with high C/N ratios were similarly possible when organic-dye-based thin layer material of a perforating type was used as the optical information recording layer 4 shown in FIG. 1.

Figure 22:
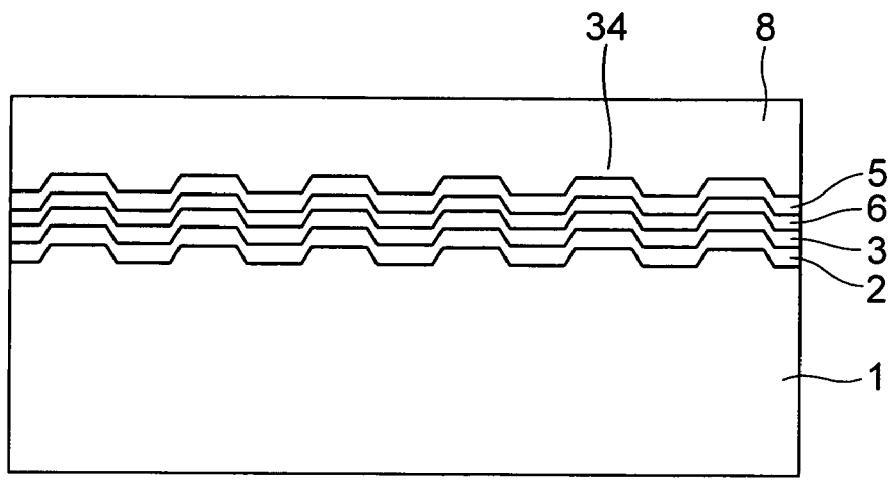
FIG. 22 is a schematic cross-sectional view showing an optical information recording medium of the ROM type in accordance with the present invention.

To carry out the above examination of optical properties also for a ROM medium (storing signals previously written on its substrate), a ROM substrate with marks and spaces of the same sizes as those of FIG. 14 was produced and evaluated. FIG. 22 is a schematic cross-sectional view showing the ROM medium which was produced, in which the reference numeral "34" denotes a record pit.

The ROM disc was produced by the following process. First, a record pit pattern including marks and spaces arranged at even intervals was formed on a photoresist using an electron beam lithography system. Subsequently, the substrate 1 was formed by copying the pit pattern into a Ni mold and injecting polycarbonate into the mold (injection molding). The minimum pit size was 0.05 μm. The depth of the pit was set at 22 nm. The track pitch was set at 310 nm.

On the substrate formed as above, a reflecting film of Ag-1% Au (wt. %) alloy was formed as the reflecting layer 2. The reflecting layer 2 was deposited to a thickness of 50 nm by DC magnetron sputtering using pure Ar gas. As the protective layers 3 and 5, amorphous films of 80ZnS-20SiO$_2$ (mol %) were used. The protective layers 3 and 5 were deposited by RF sputtering using pure Ar gas. As the super-resolution layer 6, a thin layer of No. 11 of Table 2 was employed.

The ROM medium also proved to achieve a high C/N ratio, delivering approximately 37 dB at the minimum mark size of 0.05 μm.

Figure 23:
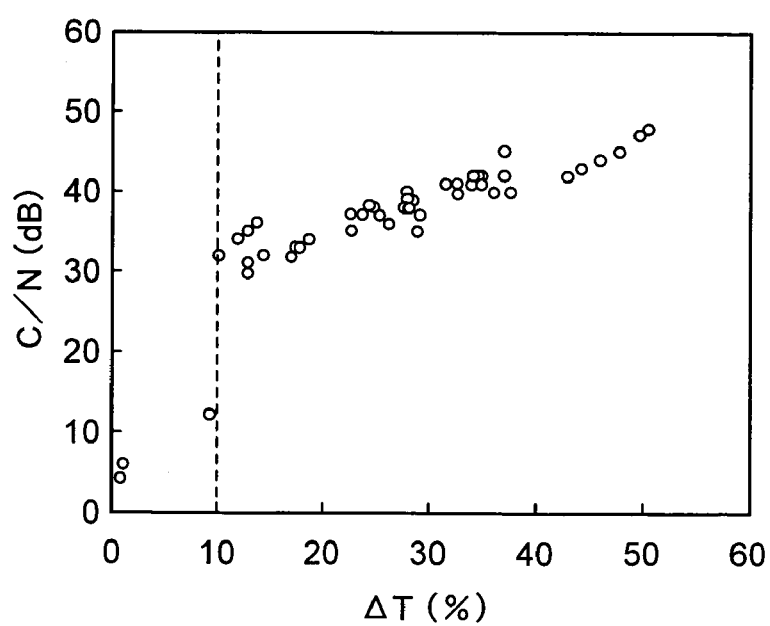
FIG. 23 is a graph showing the relationship between the specific transmittance differences ΔT and the C/N ratios shown in Tables 2-4.

Subsequently, to study the relationship between the specific transmittance difference ΔT and the C/N ratio, the data ΔT and C/N in Tables 2-4 were plotted as shown in FIG. 23. The C/N ratio was consistently 30 dB or higher when ΔT was 10% or more, while falling below 30 dB when ΔT was less than 10%. In the cases with the C/N ratios falling below 30 dB, the error rate increased remarkably in the data readout from the optical discs, hampering correct reading of data. Therefore, the specific transmittance difference ΔT is desired to be 10% or more.

Embodiment 3

Figure 24:
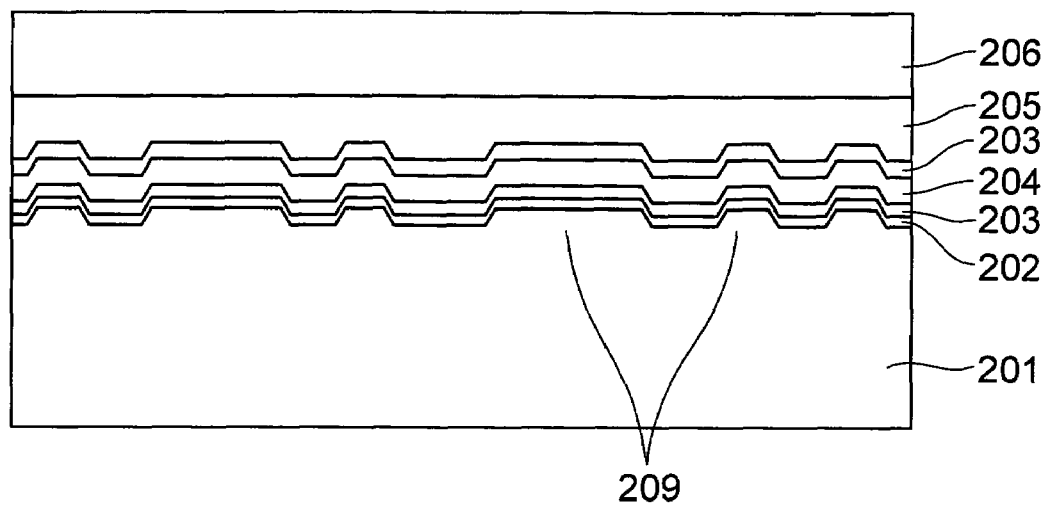
FIG. 24 is a schematic cross-sectional view showing a read-only optical disc in accordance with an embodiment of the present invention.

Another embodiment of an optical disc in accordance with the present invention will be described below. FIG. 24 is a schematic cross-sectional view showing an optical disc of this embodiment. In FIG. 24, a reference numeral "201" denotes a substrate, "202" denotes a reflecting layer, "203" denotes a protective layer, "204" denotes a super-resolution layer, "205" denotes an adhesive layer, "206" denotes a cover layer, and "209" denotes record pits. In the present invention, an $Fe_2O_3$—$Ga_2O_3$ thin layer was used as the super-resolution layer 204. The $Fe_2O_3$—$Ga_2O_3$ thin layer may be doped with heat-absorbing material such as Bi.

In this embodiment, optical discs were produced by depositing the thin layer materials on optical discs having a substrate 201 like the one shown in FIG. 24 on which a random signal pattern has been formed or on optical disc substrates exclusively for the C/N ratio test on which record pits and spaces have been formed at even intervals. In the optical discs of the present invention, information is recorded on the optical information recording layer and read out therefrom by a read/write laser beam applied and condensed on the substrate surface from the cover layer side.

An InGaN-based compound semiconductor laser emitting a laser beam of a wavelength 405 nm was used as the light source. While the semiconductor laser generally emits the laser beam continuously, a pulsed laser beam (pulsed by a pulse generator according to recording information) is applied to the optical disc. A lens having an NA of 0.85 was used for condensing the laser beam.

In this embodiment, a polycarbonate substrate 1.1 mm thick was used as the substrate 201. The substrate 201 had an external diameter of 120 mm and a center hole with an internal diameter of 15 mm for a chuck. On the substrate, a pattern of record pits 209 for the C/N ratio test with record pits and spaces arranged at even intervals or a random signal has been recorded by convexities and concavities. The convexities and concavities were formed on the same track and the track pitch in the radial direction was 310 mm. The level difference between the convexities and concavities was 22 nm.

As the random signal, record pits and spaces corresponding to record signals of 2T, 3T, 8T regarding a clock signal (1T) have been formed randomly. The record pit lengths of the shortest mark (2T signal) and the longest mark (8T signal) were set at 141 nm and 564 nm, respectively.

A signal ratio (modulation factor) relative to the longest marks can be obtained by observing the random mark signal with an oscilloscope. The resolution for the shortest marks can be judged to be higher (more improved) as the modulation factor is higher. Further, an index of the improvement of the resolution can be obtained by observing the standard deviation of time variations of the rise and fall of each mark with respect to the clock frequency (jitter). Therefore, a disc can be judged to have better properties as the jitter is lower.

The measurement of the C/N ratio was carried out by producing a C/N ratio measurement optical disc (on which record marks and spaces of the same and constant lengths were recorded alternately). The length of the mark or space is called the "mark length". Since signals of the same frequency are detected from the part, the C/N ratios for various mark lengths can be obtained by use of a spectrum analyzer. The resolution for each mark can be regarded higher as the C/N ratio is higher. In this examination, a disc was produced by forming record pits containing marks and spaces of a constant mark length on a round of track while varying the mark length among the tracks. The shortest mark length and the longest mark length were 50 nm and 600 nm, respectively. A master disc to be used for the formation of the pits was produced by electron beam lithography, using a glass substrate as the substrate. The master disc was obtained by carrying out etching after the electron beam lithography of a photoresist.

In this examination, the optical discs were evaluated by use of a disc tester which includes the aforementioned 405 nm semiconductor laser and a pickup having an optical system with a lens NA of 0.85. The tester was capable of changing the reading/writing/erasure power of the laser, the disc revolving speed, the disc tilt (radial direction, diametrical direction), etc. The modulation factor, the jitter and the C/N ratio were obtained from a signal outputted by the disc tester. The output signal was first amplified through a limit equalizer and then measured with measuring instruments. The modulation factor was measured using a digital oscilloscope. The jitter was measured using a time interval analyzer. In the jitter measurement, a track having two or more recorded tracks (with record pits formed thereon) on its both sides was selected for the measurement. The C/N ratio was measured using a spectrum analyzer.

In this examination, changes in the above values were recorded by varying the reading power Pr from 0.2 mW to 0.5 mW, in which the linear velocity of revolution of the substrate was set at 10 m/s.

On the substrate 201 shown in FIG. 24, the reflecting layer 202, the protective layer 203 and the super-resolution layer 204 made of corresponding thin layer materials were formed successively by sputtering. As the reflecting layer 202, a 99% Ag-1% Au (wt. %) alloy reflecting film was used. The reflecting layer 202 was deposited to a thickness of 20 nm by DC magnetron sputtering using pure Ar gas. As the protective layer 203, an $SiO_2$ film was used. The protective layer 203 was deposited by RF sputtering using pure Ar gas.

As the super-resolution layer 204, this embodiment focused on and examined thin layers made of a mixture of $Fe_2O_3$ and $Ga_2O_3$, out of tervalent transition metal compounds. The chemical composition of the thin layer was set at $45Fe_2O_3$-$55Ga_2O_3$ (mol %). For the formation of the mixed oxide thin layer, sintered $Ga_2O_3$ chips were put on an area of a sintered $Fe_2O_3$ target (152.4 mmφ) where the plasma concentrates (erosion area) and the chemical composition was varied by changing the number of chips. As the deposition gas, Ar gas containing oxygen in an amount between 5% and 20% was used. When the oxygen content was less than 5%, defects tended to develop in the thin layer, deteriorating repetition characteristics of the optical disc. The oxygen content over 20% reduces the deposition rate and hampers mass production.

The chemical composition of the thin layer formed was analyzed by ICP-AES. The ICP-AES was conducted by specially depositing a super-resolution layer 204 alone on a polyimide film to a thickness of 500 nm, dissolving the whole film in aqua regia, and analyzing the emission spectrum in plasma.

After successively depositing the reflecting layer 202, protective layer 203 and the super-resolution layer 204 by sputtering, the cover layer 206 was formed on the disc surface by use of the adhesive layer 205. The thicknesses of the adhesive layer 205 and the cover layer 206 were 15 µm and 85 µm (total cover layer thickness of 100 µm). The external diameter and internal diameter of the cover layer 206 were set at 120 mm (external diameter of the substrate) and 23 mm. The cover layer 206 was made of polycarbonate.

The cover layer 206 may also be formed without an adhesive, by applying ultraviolet-curing resin on the disc surface, instead of bonding the cover layer 206 with an adhesive as in this embodiment.

The cover layer was formed on the substrate by the following procedure. First, an adhesive layer 205 approximately 20 µm thick was formed on the 1.1 mm substrate by dropping an ultraviolet-curing adhesive around an inner edge of the substrate and spinning the substrate to spread the adhesive. The spinning speed was set at approximately 10,000 rpm. Meanwhile, a cover layer 0.1 mm thick was held on a base. The substrate 201 turned upside down to let the adhesive layer face downward was put on the cover layer. In the bonding step, both parts were positioned and registered precisely using a tool aligning the axes of the substrate 201 and the cover layer 206.

Subsequently, the substrate 201 and cover layer 206 bonded together were put in a vacuum chamber. The chamber was evacuated while applying vertical pressure to the bonded substrate 201 and cover layer 206 to firmly fix the two leaving no bubble. Thereafter, the substrate 201 with the cover layer 206 fixed thereon was turned upside down to let the cover layer 206 face upward and was irradiated with ultraviolet rays from the cover layer 206 side to cure the adhesive forming the adhesive layer 205.

Figure 25:
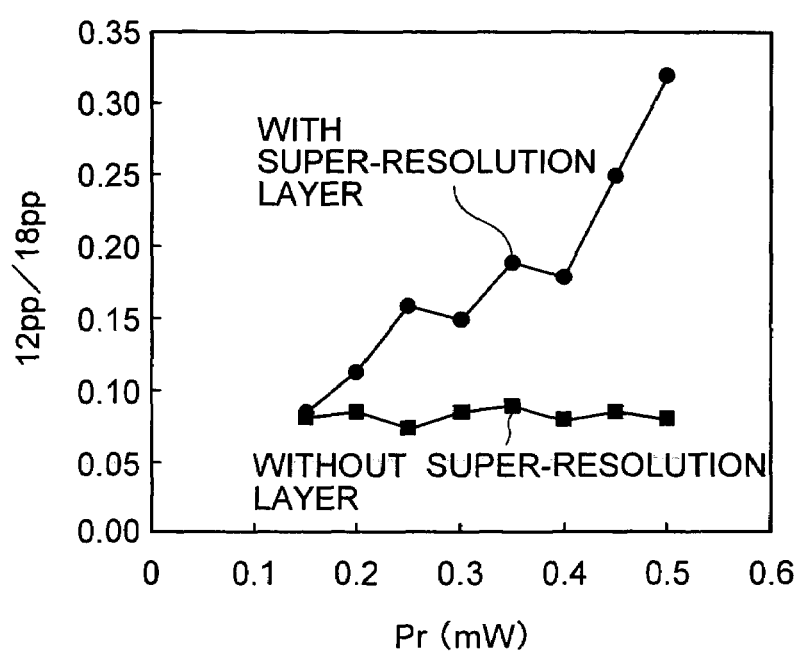
FIG. 25 is a graph showing reading power dependence of a modulation factor in optical discs having the super-resolution layer.
Figure 26:
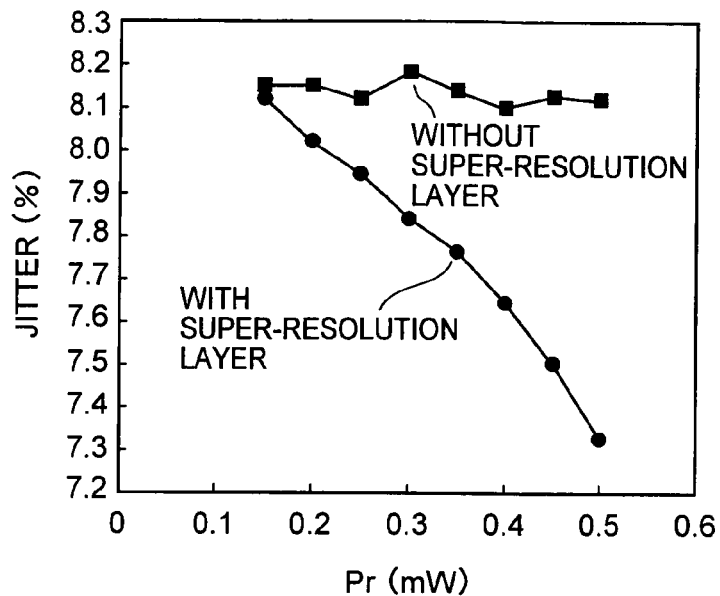
FIG. 26 is a graph showing reading power dependence of jitter in the optical discs having the super-resolution layer.
Figure 27:
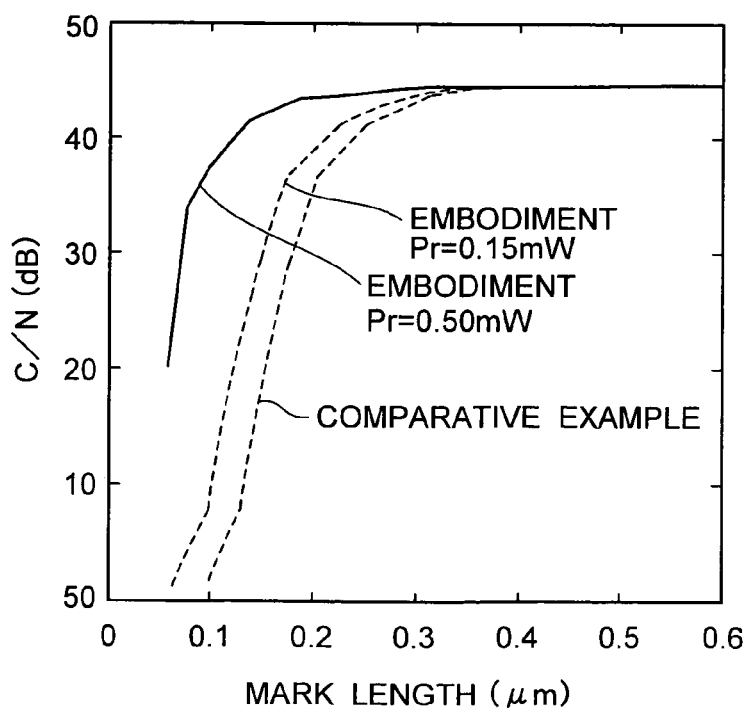
FIG. 27 is a graph showing mark length dependence of the C/N ratio in the optical discs having the super-resolution layer.

FIGS. 25-27 show the results of evaluation of the optical discs produced as above, in which FIGS. 25 shows reading power (Pr) dependence of the modulation factor ($I_{2pp}/I_{8pp}$) of the 2T marks relative to the 8T marks in the random signal, FIG. 26 shows reading power dependence of the jitter, and FIG. 27 shows mark length dependence of the C/N ratio. The reading power in FIG. 27 was set at 0.15 mW and 0.5 mW. As comparative examples, optical discs having no super-resolution layer were produced and evaluated similarly.

In the reading power dependence of the modulation factor shown in FIG. 25, the modulation factor gradually increased with the increase of the reading power Pr in optical discs having the super-resolution layer 204, in which the modulation factor at a reading power of 0.5 mW was approximately three times that at 0.2 mW. Meanwhile, in the comparative examples having no super-resolution layer 204, the modulation factor remained almost constant regardless of the increase in the reading power.

Also in the jitter shown in FIG. 26, the comparative examples having no super-resolution layer 204 exhibited almost constant jitter regardless of the increase in the reading power, while the jitter decreased from 8% to 7% in the optical discs having the super-resolution layer 204.

Referring to the C/N ratio shown in FIG. 27, the C/N ratio in the comparative examples started dropping from a mark length of approximately 180 nm and fell below 10 dB in the vicinity or 140 nm. Meanwhile, the optical discs of this embodiment exhibited a C/N ratio of approximately 10 dB at an even shorter mark length of 100 nm in the case where the reading power was 0.15 mW, further delivering a C/N ratio over 30 dB in the case where the reading power was 0.5 mW.

As above, the reading of record signals of an even shorter mark length becomes possible by providing the optical disc with an $Fe_2O_3$—$Ga_2O_3$ super-resolution layer.

Embodiment 4

Subsequently, similar measurement was carried out by changing the chemical composition of the super-resolution layer 204 in various ways and thereby the super-resolution effect was examined. This embodiment focused on two types of tervalent metal oxides and examined various mixture ratios of the compounds. The following Table 5 shows the chemical composition of the examined super-resolution layers 204 and the results of evaluation of the modulation factors, the jitter and the C/N ratios measured in the same way as in the third embodiment. As the modulation factor of each sample, a value $I_{2pp}/I_{8pp}$ at reading power of 0.5 mW is shown in Table 5 out of data like those shown in FIG. 25. As the jitter, a jitter value at the reading power 0.5 mW is shown in Table 5 out of data like those shown in FIG. 26. As the C/N ratio, a C/N ratio at a mark length of 50 nm is shown in Table 5.

Further, to obtain information on material characteristics of these super-resolution layers, the optical band gap of each thin layer and ion radius ratio between the tervalent metal ions were also evaluated. These values are also shown in Table 5.

TABLE 5

| SAMPLE NO. | SUPER-RESOLUTION LAYER COMPOSITION (MOLAR RATIO) | | MODULATION FACTOR | JITTER (%) | C/N (dB) | Eg (eV) | ΔE (eV) | CATION RADIUS UNCONFORMITY ΔR (%) |
|---|---|---|---|---|---|---|---|---|
| | OXIDE CONTAINING $Mi^{3+}$ | OXIDE CONTAINING $Mj^{3+}$ | | | | | | |
| 61 | 100 $Fe_2O_3$ | 0— | 0.20 | 10.8 | 20 | 2.60 | −0.46 | — |
| 62 | 85 $Fe_2O_3$ | 15 $Ga_2O_3$ | 0.19 | 10.4 | 25 | 2.86 | −0.20 | 3.8 |
| 63 | 80 $Fe_2O_3$ | 20 $Ga_2O_3$ | 0.21 | 10.0 | 27 | 3.01 | −0.05 | 3.8 |
| 64 | 55 $Fe_2O_3$ | 45 $Ga_2O_3$ | 0.25 | 9.4 | 30 | 3.40 | 0.34 | 3.8 |
| 65 | 50 $Fe_2O_3$ | 50 $Ga_2O_3$ | 0.31 | 8.6 | 38 | 3.64 | 0.58 | 3.8 |
| 66 | 45 $Fe_2O_3$ | 55 $Ga_2O_3$ | 0.42 | 8.2 | 40 | 3.90 | 0.84 | 3.8 |
| 67 | 20 $Fe_2O_3$ | 80 $Ga_2O_3$ | 0.38 | 8.5 | 34 | 4.40 | 1.34 | 3.8 |
| 68 | 15 $Fe_2O_3$ | 85 $Ga_2O_3$ | 0.18 | 12.2 | 18 | 4.60 | 1.54 | 3.8 |
| 69 | — | 100 $Ga_2O_3$ | 0.15 | 15.0 | 4 | 4.91 | 1.85 | — |
| 70 | 75 $Fe_2O_3$ | 25 $Cr_2O_3$ | 0.18 | 10.5 | 23 | 2.70 | −0.36 | 4.7 |
| 71 | 65 $Fe_2O_3$ | 35 $Cr_2O_3$ | 0.17 | 11.0 | 20 | 2.74 | −0.32 | 4.7 |

TABLE 5-continued

| SAMPLE NO. | SUPER-RESOLUTION LAYER COMPOSITION (MOLAR RATIO) | | MODULATION FACTOR | JITTER (%) | C/N (dB) | Eg (eV) | ΔE (eV) | CATION RADIUS UNCONFORMITY ΔR (%) |
|---|---|---|---|---|---|---|---|---|
| | OXIDE CONTAINING $Mi^{3+}$ | OXIDE CONTAINING $Mj^{3+}$ | | | | | | |
| 72 | 57 $Fe_2O_3$ | 43 $Cr_2O_3$ | 0.15 | 12.2 | 15 | 2.86 | −0.20 | 4.7 |
| 73 | — | 10 $Cr_2O_3$ | 0.11 | 15.5 | 3 | 2.96 | −0.10 | — |
| 74 | 80 $Fe_2O_3$ | 20 $Mn_2O_3$ | 0.18 | 10.9 | 22 | 2.54 | −0.52 | 0.8 |
| 75 | 66 $Fe_2O_3$ | 34 $Mn_2O_3$ | 0.20 | 11.1 | 18 | 2.50 | −0.56 | 0.8 |
| 76 | 20 $Fe_2O_3$ | 80 $Mn_2O_3$ | 0.13 | 13.4 | 10 | 2.44 | −0.62 | 0.8 |
| 77 | — | 100 $Mn_2O_3$ | 0.12 | 14.2 | 5 | 2.42 | −0.64 | — |
| 78 | 20 $Mn_2O_3$ | 80 $Ga_2O_3$ | 0.33 | 8.6 | 35 | 4.41 | 1.35 | 4.8 |
| 79 | 50 $Mn_2O_3$ | 50 $Ga_2O_3$ | 0.39 | 8.4 | 38 | 3.67 | 0.61 | 4.8 |
| 80 | 80 $Mn_2O_3$ | 20 $Ga_2O_3$ | 0.20 | 10.9 | 18 | 2.92 | −0.14 | 4.8 |
| 81 | 58 $V_2O_3$ | 42 $Ga_2O_3$ | 0.38 | 8.3 | 39 | 4.10 | 1.04 | 3.2 |
| 82 | 41 $Mo_2O_3$ | 59 $Ga_2O_3$ | 0.35 | 8.4 | 35 | 3.92 | 0.86 | 8.0 |
| 83 | 20 $Mo_2O_3$ | 80 $Ga_2O_3$ | 0.15 | 10.5 | 25 | 4.52 | 1.46 | 8.0 |
| 84 | 80 $Co_3O_4$ | 20 $Ga_2O_3$ | 0.18 | 10.9 | 22 | 2.58 | −0.48 | 0.8 |
| 85 | 66 $Co_3O_4$ | 34 $Ga_2O_3$ | 0.20 | 11.1 | 18 | 2.99 | −0.07 | 0.8 |
| 86 | 20 $Co_3O_4$ | 80 $Ga_2O_3$ | 0.33 | 8.4 | 33 | 4.32 | 1.26 | 0.8 |
| 87 | 5 $Co_3O_4$ | 95 $Ga_2O_3$ | 0.12 | 14.2 | 5 | 4.76 | 1.70 | 0.8 |
| 88 | 50 $Fe_2O_3$ | 50 $Al_2O_3$ | 0.16 | 10.8 | 22 | 2.78 | −0.28 | 17.0 |

In Table 5, each tervalent metal ion contained in each oxide on the left-hand side of the column "super-resolution layer composition" is expressed as "$Mi^{3+}$" while each tervalent metal ion contained in each oxide on the right-hand side of the column is expressed as "$Mj^{3+}$". The samples Nos. 61, 69, 73 and 77 are single-phase thin layers of $Fe_2O_3$, $Ga_2O_3$, $Cr_2O_3$ and $Mn_2O_3$, respectively. The other samples are thin layers made of solid solution, compound or mixture of two types of tervalent metal oxides. The optical band gap of each thin layer was obtained as follows. A single thin layer of each super-resolution layer material was formed on a transparent glass substrate and the transmittance of the super-resolution layer was evaluated using a spectrophotometer. The determination of the spectral transmittance curve and the calculation of the band gap were carried out in the same way as in the first embodiment.

Table 5 also shows the band gap energy Eg and the difference ΔE=Eg−E between the band gap energy Eg and energy (E=3.06 eV) of the violet laser beam (wavelength: 405 nm) employed in this embodiment. The degree of unconformity ΔR of the cation radii was obtained by the following expression:

$$\Delta R = |(R_{Mi} - R_{Mj})/R_{Mj}|$$

where "$R_{Mi}$" denotes a tervalent ion radius of the metallic element Mi and "$R_{Mj}$" denotes a tervalent ion radius of the metallic element Mj. As the ion radii, data of R. D. Shannon was used. While "$Co_3O_4$" described in Nos. 24-27 is a mixed-valence mixed oxide of $Co^{2+}$ and $Co^{3+}$, the calculation was made regarding $Co^{3+}$ as $Mi^{3+}$ and using the ion radius of $Co^{3+}$ since $CO_3O_4$ is a compound containing $Co^{3+}$.

Figure 28:
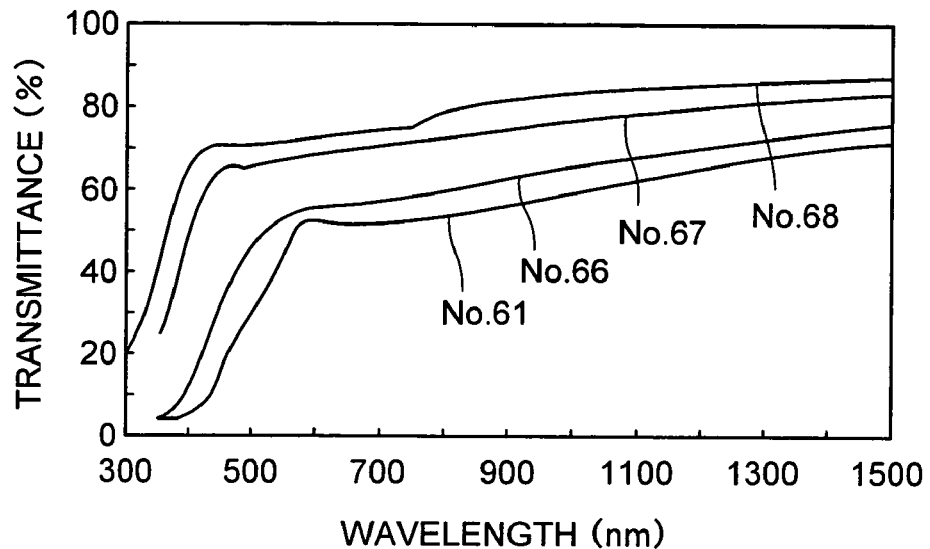
FIG. 28 is a graph showing spectral transmittance of a $Fe_2O_3$ super-resolution layer and $Fe_2O_3$—$Ga_2O_3$ super-resolution layers.
Figure 29:
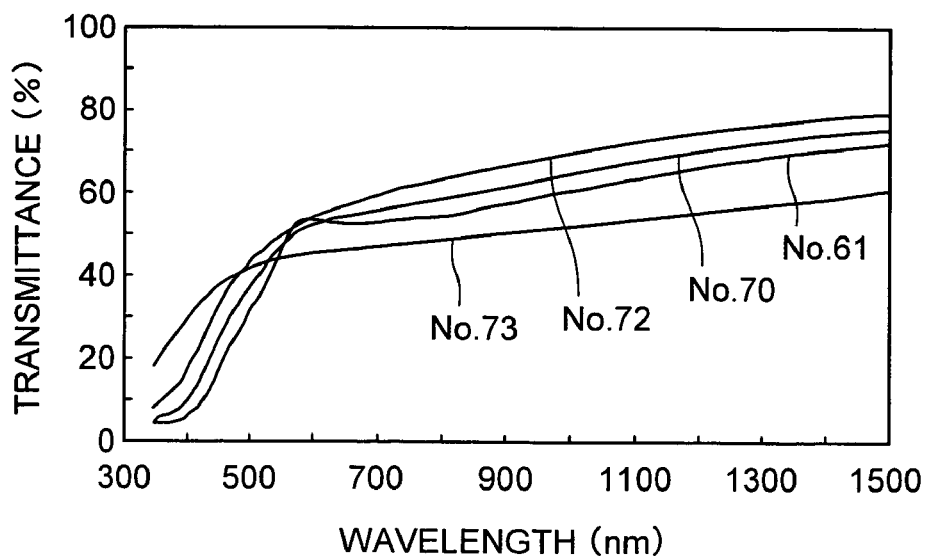
FIG. 29 is a graph showing spectral transmittance of the $Fe_2O_3$ super-resolution layer, $Fe_2O_3$—$Cr_2O_3$ super-resolution layers and a $Cr_2O_3$ super-resolution layer.
Figure 30:
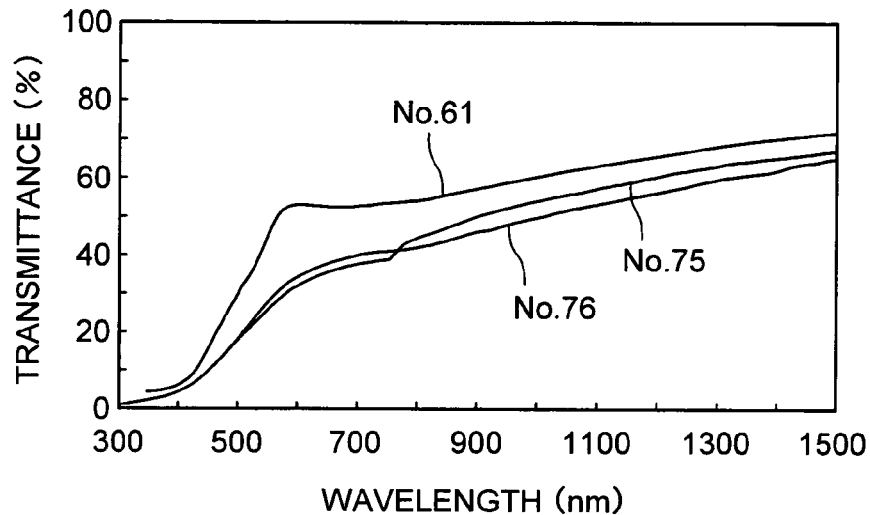
FIG. 30 is a graph showing spectral transmittance of the $Fe_2O_3$ super-resolution layer and $Fe_2O_3$—$Mn_2O_3$ super-resolution layers.

FIGS. 28, 29 and 30 show the transmittance of the $Fe_2O_3$—$Ga_2O_3$ thin layers, the $Fe_2O_3$—$Cr_2O_3$ thin layers and the $Fe_2O_3$—$Mn_2O_3$ thin layers shown in Table 5. Referring to FIG. 28, the absorption edge shifts to the short-wavelength side with the increase of the $Ga_2O_3$ content. Also in the $Fe_2O_3$—$Cr_2O_3$ thin layers shown in FIG. 29, a similar shift of the absorption edge to the short-wavelength side (the so-called "blue shift") was seen with the increase of the $Cr_2O_3$ content; however, the widths of the blue shift are smaller than those of the layers containing $Ga_2O_3$. In the $Fe_2O_3$—$Mn_2O_3$ thin layers shown in FIG. 30, the absorption edge slightly shifted to the long-wavelength side with the increase of the $Mn_2O_3$ content.

Figure 31:
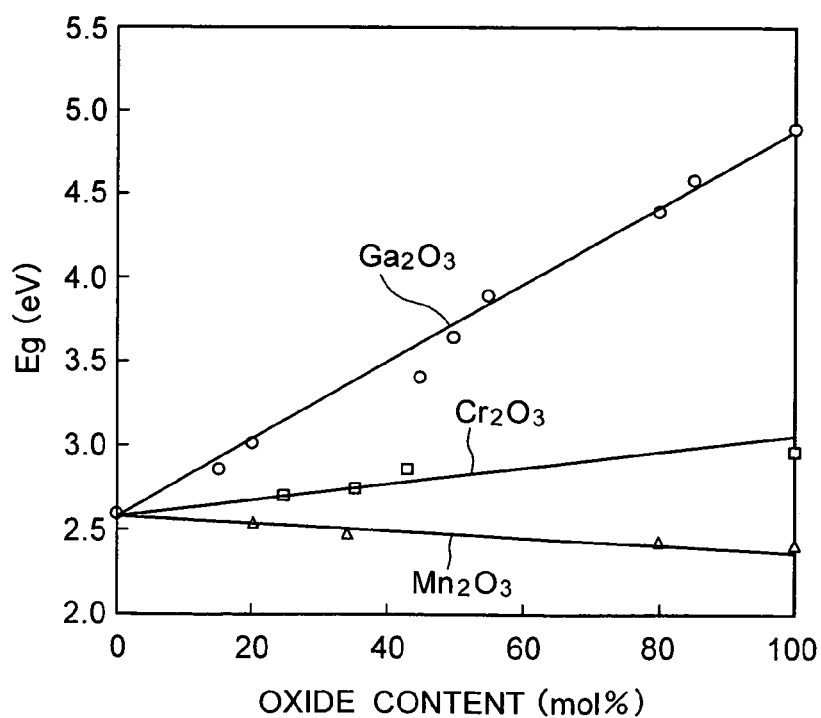
FIG. 31 is a graph showing the relationship between band gap energy and the oxide content.

From the data of FIGS. 28, 29 and 30, the band gap energy Eg of each thin layer was obtained by carrying out the hv−$(\alpha hv)^2$ plot. FIG. 31 shows the relationship between the band gap energy Eg [eV] and the content (percentage) [mol %] of each oxide. In the $Fe_2O_3$—$Ga_2O_3$ thin layers, the band gap shifted from 2.60 eV to 4.91 eV, linearly with respect to the chemical composition. In the $Fe_2O_3$—$Cr_2O_3$ thin layers, the band gap shifted from 2.60 eV to 2.96 eV, with smaller shift widths compared to the $Fe_2O_3$—$Ga_2O_3$ thin layers. On the other hand, the band gap decreased from 2.60 eV to 2.42 eV in the $Fe_2O_3$—$Mn_2O_3$ thin layers.

Regarding the thin layers, the optical disc properties were also evaluated. In the $Fe_2O_3$—$Ga_2O_3$ thin layers, the $45Fe_2O_3$-$55Ga_2O_3$ thin layer of sample No. 66 proved to deliver excellent values of the modulation factor, jitter and C/N ratio. All the properties had a tendency to deteriorate on both sides of No. 66 (as the composition got $Fe_2O_3$-rich or $Ga_2O_3$-rich). The single-phase $Ga_2O_3$ thin layer of No. 69 proved to show unsatisfactory disc properties.

The samples No. 70-No. 73 and No. 74-No. 77 are $Fe_2O_3$—$Cr_2O_3$ thin layers, a single-phase $Cr_2O_3$ thin layer, $Fe_2O_3$—$Mn_2O_3$ thin layers and a single-phase $Mn_2O_3$ thin layer. These materials did not clearly improve the disc properties like $Ga_2O_3$.

Meanwhile, the samples No. 78-No. 80, No. 81-No. 83 and No. 84-No. 87 are thin layers as mixtures of $Ga_2O_3$ and various transition metal oxides containing tervalent ions. In this case, it became clear that there exists chemical composition displaying excellent results in all the disc properties (modulation factor, jitter and C/N ratio).

The sample No. 84 is an $Fe_2O_3$—$Al_2O_3$ thin layer. The sample No. 84 displayed characteristics similar to those of the $Fe_2O_3$ thin layer of No. 61 and did not clearly improve the optical disc properties. This may be attributed to an insufficient band gap shift as a consequence of a very high cation radius ratio (17%) between Fe and Al (cations of $Fe_2O_3$ and $Al_2O_3$) preventing $Al_2O_3$ from dissolving in $Fe_2O_3$. If the ion radius ratio is 8.0 or less, the band gap can be changed properly corresponding to the amounts of two metal oxides added together and thereby a strong super-resolution effect can be achieved.

As above, in cases where a mixture of oxides containing tervalent metal ions ($Fe_2O_3$, $Ga_2O_3$, $Mn_2O_3$, $V_2O_3$, $Mo_2O_3$, $Co_3O_4$, etc.) is used as the super-resolution layer 204, if a mixed oxide (a mixture of two oxides) with an ion radius ratio of 8.0 or less is used and the optical band gap of the mixture is 3.60 eV or more and 4.41 eV or less, an excellent result can be achieved in the improvement of the record density in an optical disc system using the 405 nm violet laser. Since the band gap of the violet laser is 3.06 eV, an excellent super-resolution effect can be obtained if the difference $\Delta E(=Eg-E)$ between the band gap energy Eg of the super-resolution layer and the energy E of the laser beam is 0.4 eV or more and 1.4 eV or less.

When the ion radius ratio exceeds 8.0, the band gap shift does not occur sufficiently even if a mixture is made and it is difficult to obtain a thin layer having a strong super-resolution effect. If the difference $\Delta E$ between the band gap energy Eg of the super-resolution layer and the energy E of the laser beam applied is 1.4 eV or more and 0.4 eV or less, an extremely strong super-resolution effect can be obtained.

In the case of a super-resolution layer made of a mixture of $Fe_2O_3$ and $Ga_2O_3$, if the $Ga_2O_3$ content is 45 mol % or more and 80 mol % or less, the C/N ratio marks 30 dB or more and excellent properties can be achieved. In this case, the $Fe_2O_3$ content is desired to be 20 mol % or more and 55 mol % or less. If the $Ga_2O_3$ content is less than 45 mol %, the difference $\Delta E$ falls below 0.4 eV (out of the suitable range) and it is difficult to obtain strong super-resolution effect. Similarly, the $Ga_2O_3$ content exceeding 80% is also undesirable since $\Delta E$ exceeds 1.4 eV.

While examples of mixtures of two oxides have been described in this embodiment, it was found that similar effects can be achieved even when three or more oxides satisfying the above conditions are mixed together if the above conditions are satisfied by any two types of metal ions. For example, even when a ternary super-resolution layer is formed of a mixture of $Fe_2O_3$, $Mn_2O_3$ and $Ga_2O_3$, it is possible to produce an optical disc having a strong super-resolution effect if the mixture is a combination of oxides with $\Delta E$ between 0.4 eV and 1.4 eV and $\Delta R$ of 8% or less.

Embodiment 5

The mechanism causing the strong super-resolution effect described above was studied. In this embodiment, the change in transmittance caused by heating was examined, focusing on the heating by the laser irradiation. Further, examinations of the $Fe_2O_3$—$Ga_2O_3$ thin layers shown in Table 5 were carried out. A heating/cooling sample stage was attached to the spectrophotometer shown in the fourth embodiment and the change in the spectral transmittance curve caused by heating/cooling processes was obtained.

Figure 32:
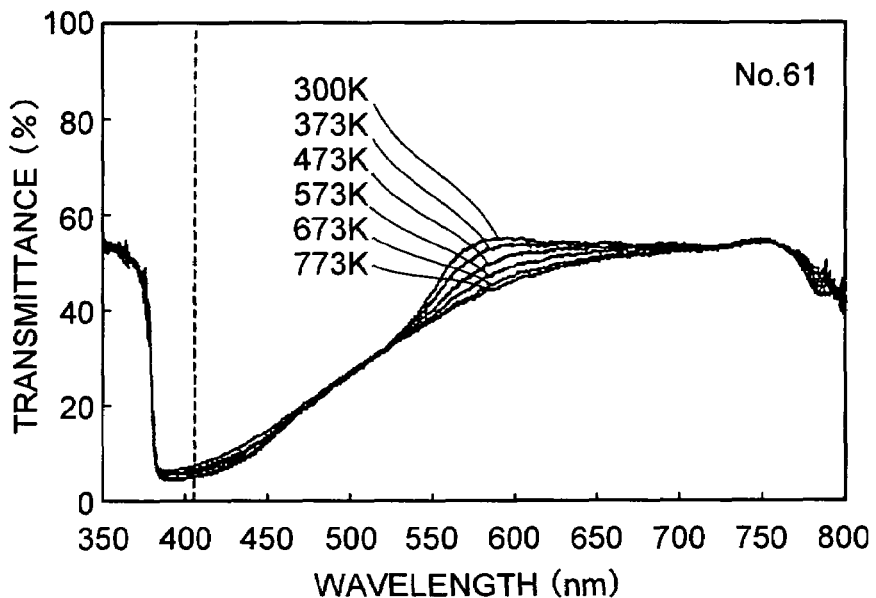
FIG. 32 is a graph showing the temperature dependence of transmittance of a sample No. 61 of Table 5.

FIG. 32 shows the transmittance change of the $Fe_2O_3$ thin layer of No. 61 of Table 5 caused by heating. As seen in FIG. 32, the thin layer has a wavelength range around 600 nm where the transmittance is changed markedly by heating. While similar transmittance change is also seen in the vicinity of 400 nm, the absolute value of transmittance is small.

Figure 33:
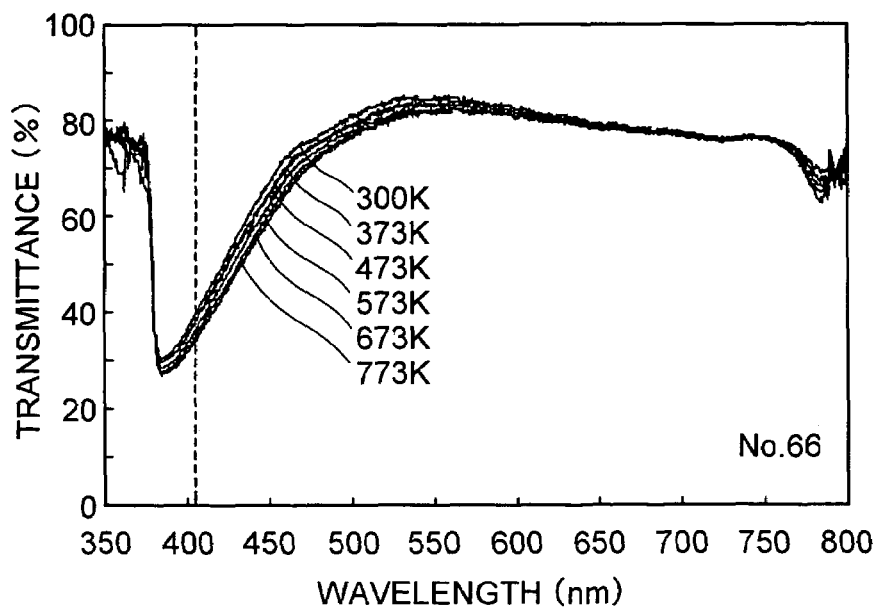
FIG. 33 is a graph showing the temperature dependence of transmittance of a sample No. 66 of Table 5.
Figure 34:
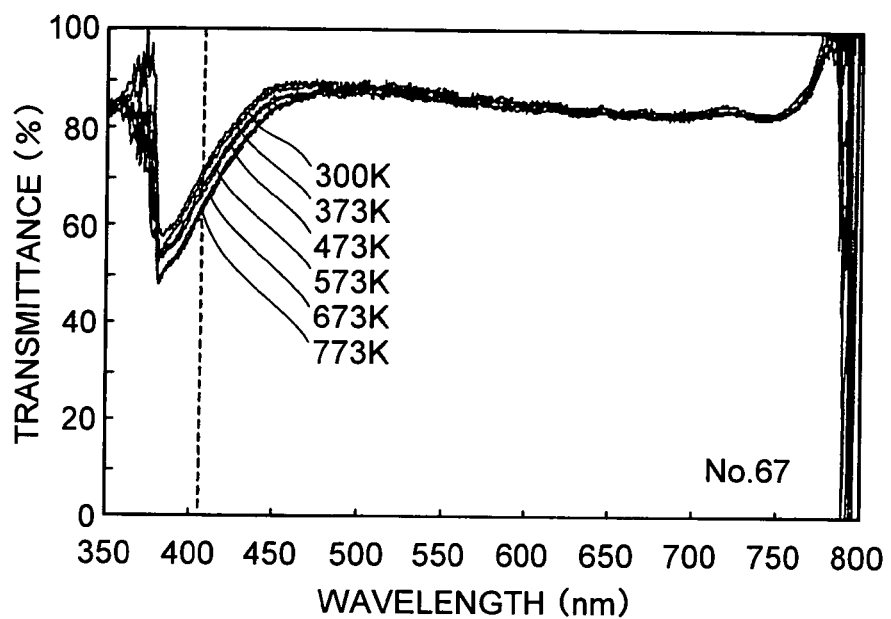
FIG. 34 is a graph showing the temperature dependence of transmittance of a sample No. 67 of Table 5.
Figure 35:
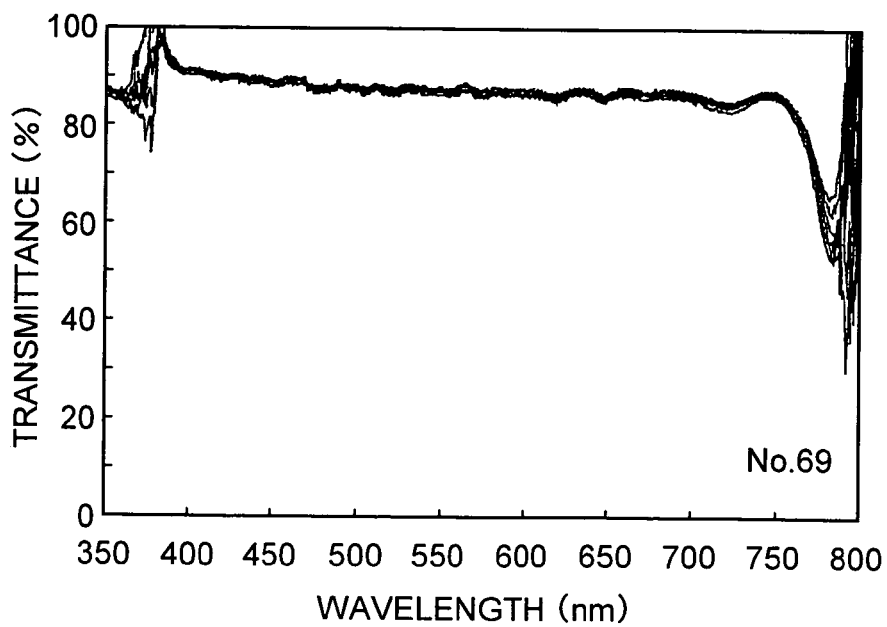
FIG. 35 is a graph showing the temperature dependence of transmittance of a sample No. 69 of Table 5.

FIG. 33 shows the transmittance change of the $45Fe_2O_3$-$55Ga_2O_3$ thin layer of No. 66 of Table 5 caused by heating. A decrease in transmittance caused by heating was seen in a wavelength range below 600 nm, in which a large transmittance change was obtained in a wavelength range between 400 nm and 500 nm. The transmittance around the wavelength 405 nm was approximately 30%. FIG. 34 shows the transmittance change of the $20Fe_2O_3$-$80Ga_2O_3$ thin layer of No. 67 of Table 5, in which the absorption edge further shifted to the short-wavelength side and the transmittance changed markedly in a wavelength range below 450 nm. The transmittance at 400 nm was approximately 60%. FIG. 35 shows the transmittance change of the single phase $Ga_2O_3$ thin layer of No. 69 of Table 5, in which no band gap (existing at a shorter wavelength) was observed, and thus no transmittance change was seen around 400 nm.

As above, a change in transmittance caused by heating is seen in the vicinity of the absorption edge, and thus a large transmittance change can be achieved at a desired wavelength by changing the absorption edge wavelength.

Figure 36:
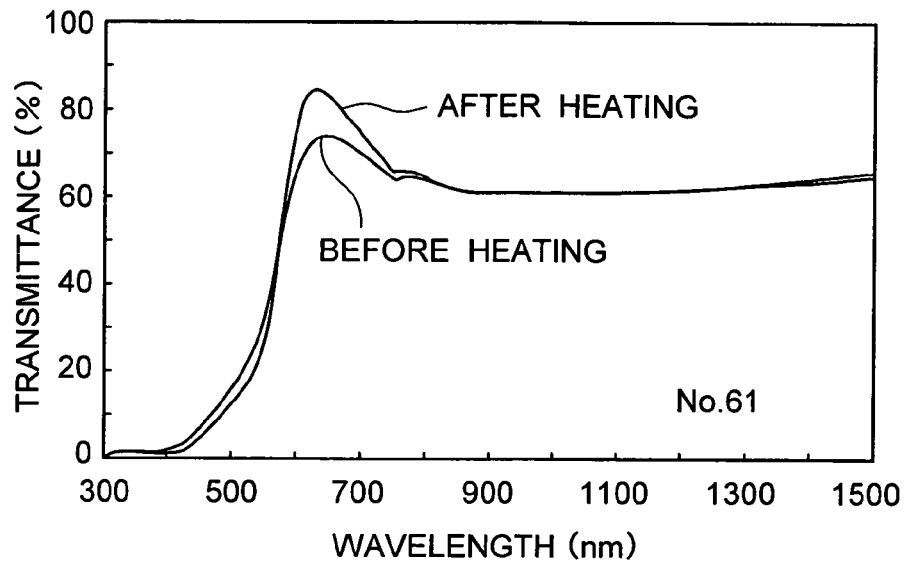
FIG. 36 is a graph showing spectral characteristics of the transmittance of a sample No. 1 of Table 1 before and after heating.
Figure 37:
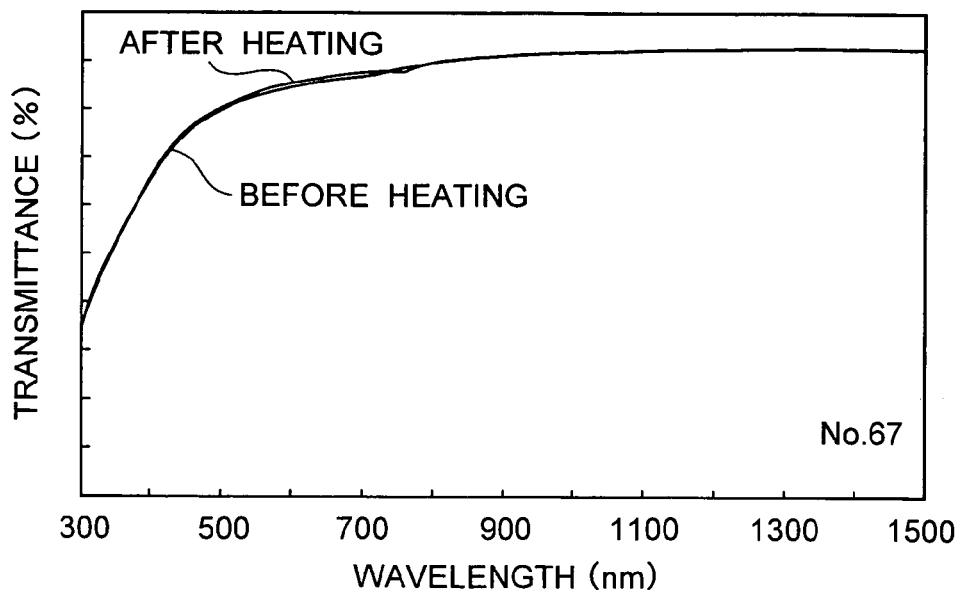
FIG. 37 is a graph showing spectral characteristics of the transmittance of a sample No. 7 of Table 1 before and after heating.

FIGS. 36 and 37 show the spectral transmittance curves of the $Fe_2O_3$ thin layer of No. 61 of Table 5 and the $Fe_2O_3$—$Ga_2O_3$ thin layer of No. 67 of Table 5 before and after a heating process. In the $Fe_2O_3$ thin layer shown in FIG. 36, spectral characteristics are significantly different before and after the heating, indicating that film-structure has changed due to the heating. Meanwhile, in the $Fe_2O_3$—$Ga_2O_3$ thin layer shown in FIG. 37, almost no difference is seen between the spectral transmittance curves before and after the heating process, showing that the structural change caused by heating is small in the thin layer containing $Ga_2O_3$. Therefore, degradation caused in the optical disc structure by the repetitive laser irradiation is small.

Figure 38:
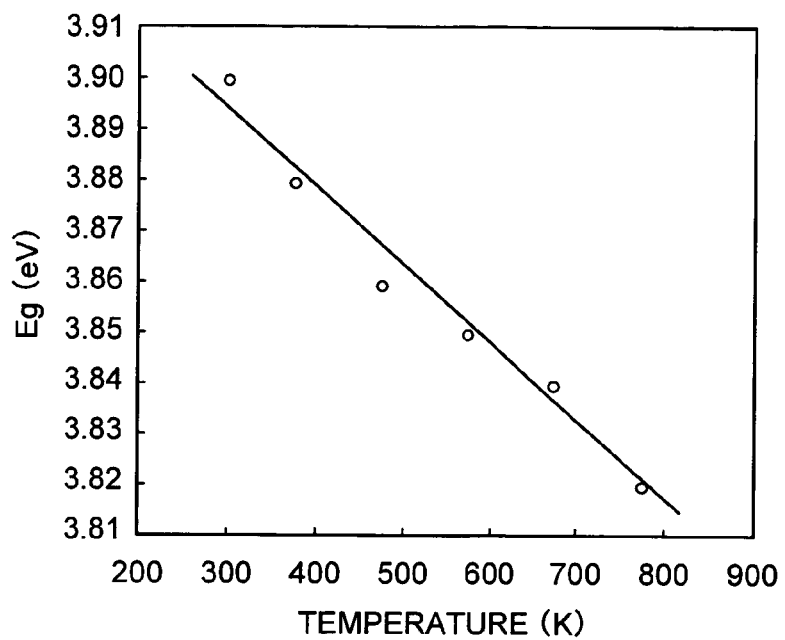
FIG. 38 is a graph showing temperature dependence of band gap energy of the sample No. 66 of Table 5.

From the transmittance change of the $45Fe_2O_3$-$55Ga_2O_3$ thin layer (No. 66 of Table 5) shown in FIG. 33, the change in the band gap energy was obtained using the relationships (1)-(3). The change in the $(\alpha h\nu)^2$–$h\nu$ plot caused by heating is shown in FIG. 38, which indicates that the band gap decreased from 3.90 eV to 3.82 eV (the so-called red shift occurred). This can be regarded as the cause of the transmittance change occurring below 420 nm.

Figure 39:
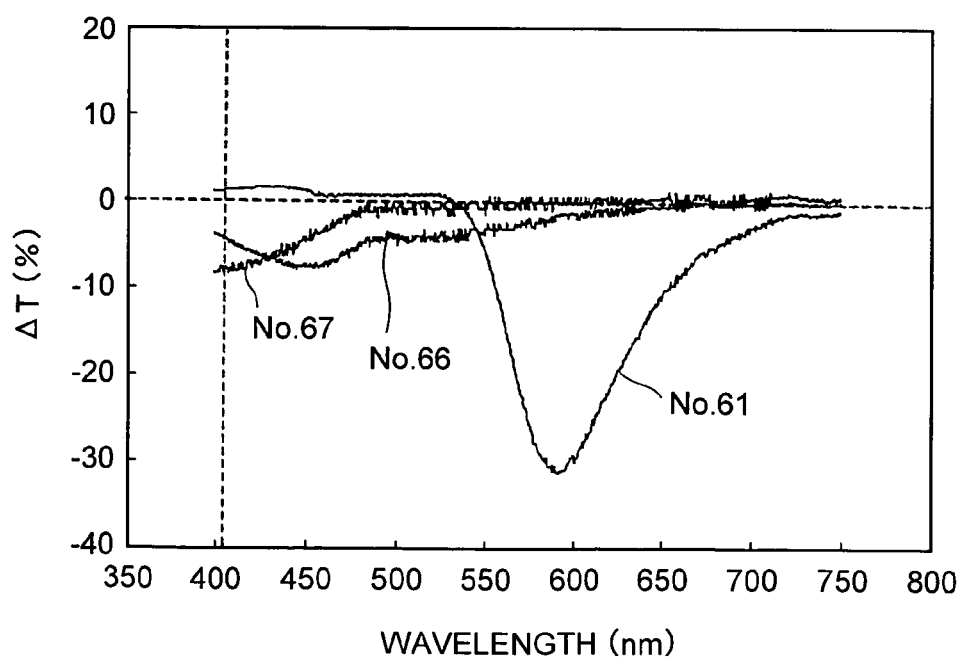
FIG. 39 is a graph showing temperature dependence of a transmittance difference ΔT of samples No. 1, No. 6 and No. 7 of Table 1.

FIG. 39 shows a transmittance difference $\Delta T=T(500°\text{ C.})-T(\text{room temperature})$ of the samples No. 61, No. 66 and No. 67 of Table 5. The $Fe_2O_3$ thin layer sample of No. 61 has a wavelength range around 600 nm exhibiting extremely large $\Delta T$, while $\Delta T$ is as small as a few % in the vicinity of 400 nm corresponding to a blue laser. Meanwhile, the samples No. 66 and No. 67 have larger $\Delta T$ around 400 nm compared to the sample No. 61. The wavelength corresponding to the maximum transmittance difference shifted to the short-wavelength side in response to the blue shift of the transmittance shown in FIGS. 33-35.

As above, by the mixing of $Fe_2O_3$ with $Ga_2O_3$, the band gap shifted linearly and the largest transmittance change around the wavelength 400 nm was achieved by the $20Fe_2O_3$-$80Ga_2O_3$ composition.

However, it is indicated in Table 5 that the sample No. 66 has more excellent optical disc properties than the sample No. 67. Since heating by laser irradiation (not the heating from outside as in this embodiment) is necessary in the optical disc structure, effects of heat absorption must be taken into consideration. As shown in FIGS. 33 and 34, the thin layer No. 67 has an absorption edge shifted to the short-wavelength side from that of the thin layer No. 66 and thereby has high transmittance of approximately 60% at the wavelength 400 nm. Therefore, there is a possibility of insufficient absorption of the laser beam applied to the thin layer No. 67.

As a countermeasure against the problem, it is possible to raise the temperature of the super-resolution layer by forming a heat-absorbing layer or by dispersing a material having excellent heat absorption characteristics in the super-resolution layer. Therefore, the heat-absorbing layer and the heat-absorbing materials were studied next.

Embodiment 6

Figure 40:
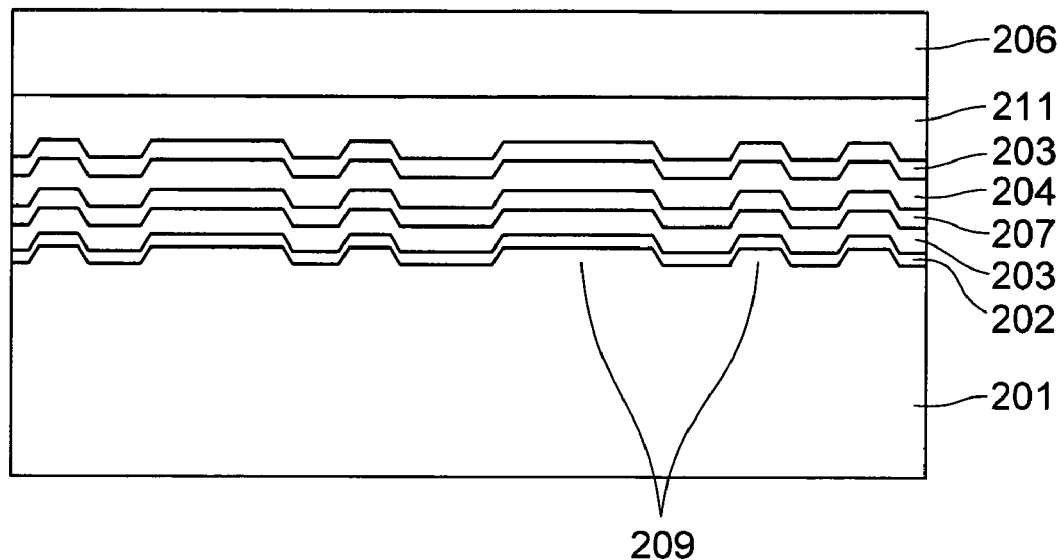
FIG. 40 is a schematic cross-sectional view showing a read-only optical disc in accordance with another embodiment of the present invention.

FIG. 40 shows a ROM disc according to this embodiment. In this embodiment, an ultraviolet curing resin layer 211 (instead of the adhesive layer) and a heat-absorbing layer 207 were employed. While the heat-absorbing layer 207 may be formed at any position between the substrate 201 and the ultraviolet curing resin layer 211, it is desirable that the heat-absorbing layer 207 be formed just under the super-resolution layer 204 as shown in FIG. 40.

The manufacturing method of the optical disc is similar to that in the first embodiment. In this embodiment, the heat-absorbing layer 207 was formed by depositing metallic Bi to a thickness of 20 nm by sputtering. The heat-absorbing layer 207 may be formed of any material as long as it has a large absorption coefficient for the laser wavelength employed, high heat capacity and low thermal conductivity. Typical materials for the heat-absorbing layer include metallic Bi, Mn, Zr, Cr, Co—Cr—Zr, Ge—Sb—Te, etc.

The mark length dependence of the C/N ratio was examined with and without the heat-absorbing layer. In the experiment, the reading power was set at 0.15 mW. As the super-resolution layer, the $45Fe_2O_3$-$55Ga_2O_3$ (mol %) thin layer (No. 66 of Table 5) and the $20Fe_2O_3$-$80Ga_2O_3$ (mol %) thin layer (No. 67 of Table 5) were used. When no heat-absorbing layer was formed, the optical disc employing the thin layer No. 66 maintained higher C/N ratio up to short mark lengths in comparison with the optical disc employing the thin layer No. 67, displaying a higher super-resolution effect. On the other hand, when a heat-absorbing layer was formed, both optical discs displayed high C/N ratios at even shorter mark lengths; however, the optical disc with the thin layer No. 67 delivered higher C/N ratio compared to the optical disc with No. 66. This may be attributed to the larger transmittance difference of the thin layer No. 67 at the wavelength 405 nm as shown in the third embodiment. With the heat-absorbing layer, the temperature of the super-resolution layer 204 increases sufficiently to achieve higher C/N ratio compared to the optical disc with No. 66.

Next, to deposit fine particles of metallic Bi in the super-resolution layer 204, sputtering was carried out by putting a metallic Bi chip, in addition to the $Ga_2O_3$ chips, on the $Fe_2O_3$ sputtering target for the formation of the super-resolution layer 204. The $Fe_2O_3$—$Ga_2O_3$ composition was set at $20Fe_2O_3$-$80Ga_2O_3$ (mol %) To examine the structure of the super-resolution layer 204 formed as above, a single-phase thin layer of the material was formed on a glass substrate and X-ray diffraction analysis and spectral characteristics evaluation were carried out.

In the X-ray diffraction analysis, a broad peak that seems to originate in the metallic Bi was detected in addition to a peak of $Ga_2O_3$. A calculation for obtaining the Bi particle diameter employing the Scherrer's equation confirmed that the source of the broad peak was fine particles of a diameter of approximately 10 nm. An examination of spectral transmittance of the thin layer indicated that the transmittance had dropped significantly from the spectral transmittance curve of the thin layer No. 67. The examination also showed that the drop in the transmittance increases as the wavelength gets shorter. This may be caused by scattering by the nanometer-size particles of Bi. The transmittance at the wavelength 400 nm was approximately 17%.

Regarding the above thin layer, optical discs of the ROM type shown in FIG. 24 were produced and the C/N ratio was measured. In the experiment, the reading power was set at 0.15 mW. The super-resolution layer 67 containing Bi proved to allow reproduction of data with higher C/N ratio up to a shorter mark length, compared to the super-resolution layer 67 containing no Bi.

As above, by forming a heat-absorbing layer 207 or by putting heat-absorbing material in the super-resolution layer 204, it has become possible to let the super-resolution layer absorb the laser beam efficiently and deliver a strong super-resolution effect even with lower power.

Embodiment 7

Figure 41:
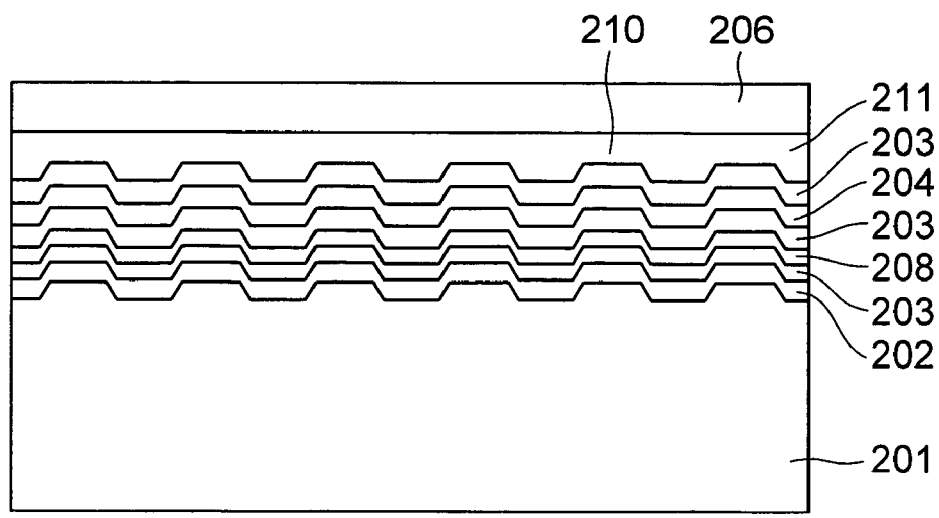
FIG. 41 is a schematic cross-sectional view showing a readable and writable optical disc in accordance with an embodiment of the present invention.

The above is the result of examination of ROM-type optical discs in which the record pits are formed on a polycarbonate substrate. Subsequently, recordable write-once media (on which information can be written) and rewritable media (allowing reading, writing and erasure of information) were produced and the super-resolution effect was examined similarly. Meanwhile, an optical information recording and reproducing apparatus capable of reading and writing information from/to the record media was produced. The cross-sectional structure of an optical disc according to this embodiment is shown in FIG. 41. The optical disc of this embodiment is provided with an optical recording layer 208 and a guide groove 210 for guiding light. Although not shown in FIG. 41, it is possible to form a heat-absorbing layer 207 as in the sixth embodiment.

As the optical recording layer 208, a Ge—Sb—Te recording layer of a film thickness of 20 nm was used. The optical disc was produced in the same way as the third embodiment. After the production process, a process for crystallizing the optical recording layer 208 was carried out using an initializing device equipped with a laser emitting a continuous 633 nm laser beam. In this embodiment, the $45Fe_2O_3$-$55Ga_2O_3$ (mol %) thin layer (No. 66 of Table 5) was used as the super-resolution layer 204.

Figure 42:
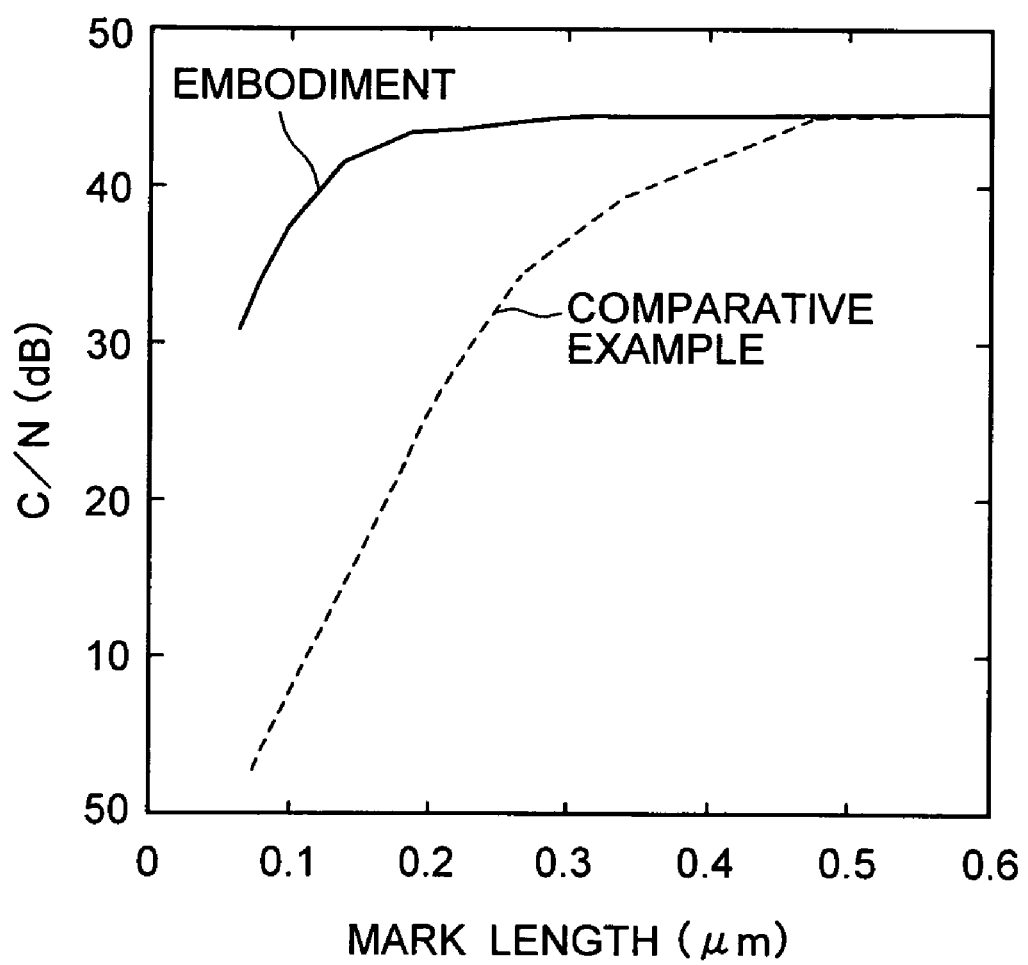
FIG. 42 is a graph showing mark length dependence of the C/N ratio of the readable and writable optical disc produced in the present invention.

Data recording was carried out in the same way as the first embodiment, using the optical information recording and reproducing apparatus of FIG. 21 and the signal waveform of FIG. 15. FIG. 42 shows the mark length dependence of the C/N ratio. A result for an optical disc without the super-resolution layer 204 is also shown in FIG. 42 as a comparative example. As seen in FIG. 42, strong super-resolution effect was achieved also in the RAM disc including the super-resolution layer 204.

The optical information recording medium equipped with the super-resolution layer in accordance with the present invention is capable of dealing with high revolving speed even with low laser power. A high-capacity optical information recording medium can be obtained with a deposition process in conformity with conventional processes, and thus the usability of the optical information recording medium in accordance with the present invention is extremely high.

While the present invention has been described with reference to the above illustrative embodiments, it is not to be restricted by the particular embodiments but only by the appended claims. It is to be appreciated that those skilled in the art can make various modifications to the embodiments without departing from the scope and spirit of the present invention.

The invention claimed is:

1. An optical information recording medium including an optical information recording layer on which information is recorded by light energy, a reflecting layer reflecting light and a super-resolution layer reducing a diameter of a beam of light applied thereto which are formed on a substrate, wherein the optical information recording medium comprises a metal oxide or compound semiconductor, and wherein the super-resolution layer of the recording medium has a wavelength $\lambda g$ corresponding to band gap energy Eg in stationary state and a difference $\Delta\lambda=\lambda-\lambda g$ from a wavelength $\lambda$ of a laser beam to be irradiated on the optical information recording medium for information read/write is more than −100 nm to less than 60 nm, and a transmittance $T_0$ of the material in the stationary state at the wavelength $\lambda$ changes to a transmittance T such that an expression $\Delta T=|T-T_0|/T_0\times100$ becomes over 10%;

wherein the super-resolution layer is formed of a mixture of $Fe_2O_3$ and one selected from $Cr_2O_3$, $CeO_2$, MnO, ZnO, NiO, CoO, MgO, CuO, BaO, $Y_2O_3$ and CdO.

2. An optical information recording and reproducing apparatus comprising: an optical information recording medium including a reflecting layer, an optical information recording layer and a super-resolution layer which are formed on a substrate; a pickup for reading and writing optical information from/to the optical information recording medium; and a motor for driving and rotating the optical information recording medium, wherein the optical information recording apparatus includes the recording medium of a metal oxide or compound semiconductor, and wherein the super-resolution layer of the recording medium has a wavelength $\lambda g$ corresponding to band gap energy Eg in stationary state and a difference $\Delta\lambda=\lambda-\lambda g$ from a wavelength $\lambda$ of a laser beam to be irradiated on the optical information recording medium for information read/write is more than −100 nm to less than 60 nm, and a transmittance $T_0$ of the material in the stationary state at the wavelength $\lambda$ changes to a transmittance T such that an expression $\Delta T=|T-T_0|/T_0\times100$ becomes over 10%;

wherein the super-resolution layer is formed of a mixture of $Fe_2O_3$ and one selected from $Cr_2O_3$, $CeO_2$, MnO, ZnO, NiO, CoO, MgO, CuO, BaO, $Y_2O_3$ and CdO.

3. An optical information recording medium including at least a reflecting layer, an optical information recording layer, a super-resolution layer and a protective layer which are formed on a substrate, wherein the super-resolution layer is a thin layer whose an optical constant changes nonlinearly due to a red shift of its band gap when heated by irradiation with a laser beam for information read/write, and the super-resolution layer is made of solid solution, compound or mixture of metal oxides containing two or more types of metal ions of the same valence, and ion radius unconformity $\Delta R=|(RM_i-RM_j)/RM_j|$ between ion radii $RM_i$ and $RM_j$ of two types of metal ions $M_i$ and $M_j$ arbitrarily selected from the two or more types of metal ions is 8% or less, and a difference $\Delta E=Eg-E$ between band gap energy Eg of the mixture of the metal oxides and energy E corresponding to a wavelength of the laser beam is 0.4 eV or more and 1.4 eV or less.

4. An optical information recording medium including at least a reflecting layer, an optical information recording layer, a super-resolution layer and a protective layer which are formed on a substrate, wherein the super-resolution layer contains $Fe_2O_3$ and $Ga_2O_3$.

5. The optical information recording medium according to claim 4, wherein the super-resolution layer contains $Fe_2O_3$ in an amount between 20% and 55% and $Ga_2O_3$ in an amount between 45% and 80%.

6. The optical information recording medium according to claim 3, further comprising a heat-absorbing layer over the substrate.

7. The optical information recording medium according to claim 4, further comprising a heat-absorbing layer over the substrate.

8. The optical information recording medium according to claim 6, wherein the heat-absorbing layer is made of material selected from Bi, Mn, Zr, Cr, Co—Cr—Zr based alloy and Ge—Sb—Te based alloy.

9. The optical information recording medium according to claim 7, wherein the heat-absorbing layer is made of material selected from Bi, Mn, Zr, Cr, Co—Cr—Zr based alloy and Ge—Sb—Te based alloy.

10. The optical information recording medium according to claim 3, wherein the super-resolution layer contains heat-absorbing material dispersed therein.

11. The optical information recording medium according to claim 4, wherein the super-resolution layer contains heat-absorbing material dispersed therein.

12. The optical information recording medium according to claim 10, wherein the heat-absorbing material is selected from Bi, Mn, Zr, Cr, Co—Cr—Zr based alloy and Ge—Sb—Te based alloy.

13. The optical information recording medium according to claim 11, wherein the heat-absorbing material is selected Bi, Mn, Zr, Cr, Co—Cr—Zr based alloy and Ge—Sb—Te based alloy.

14. The optical information recording medium according to claim 3, wherein the optical information recording layer is an information-writable thin layer formed over the substrate.

15. The optical information recording medium according to claim 4, wherein the optical information recording layer is an information-writable thin layer formed over the substrate.

16. The optical information recording medium according to claim 3, wherein the optical information recording layer is a record pattern directly written on the substrate.

17. The optical information recording medium according to claim 4, wherein the optical information recording layer is a record pattern directly written on the substrate.

18. An optical information recording and reproducing apparatus including at least a pickup for reading and writing optical information from/to an optical information recording medium and a spindle motor with a spindle for supporting, driving and rotating the optical information recording medium, wherein the optical information recording medium at least includes a substrate and a reflecting layer, an optical information recording layer, a super-resolution layer and a protective layer which are formed on a recording surface of the substrate, and the super-resolution layer contains $Fe_2O_3$ and $Ga_2O_3$.

19. The optical information recording and reproducing apparatus according to claim 18, wherein the optical information recording medium includes a heat-absorbing layer.

20. The optical information recording and reproducing apparatus according to claim 18, wherein the super-resolution layer contains heat-absorbing material dispersed therein.

21. The optical information recording medium according to claim 4, wherein the super-resolution layer further includes at least one material selected from NiO, CoO, ZnO, $Cr_2O_3$, $CeO_2$, MnO, $SiO_2$, $TiO_2$, MgO, CuO, BaO, $Y_2O_3$ and Cd).

* * * * *